United States Patent
Ogino et al.

(10) Patent No.: US 12,354,407 B2
(45) Date of Patent: Jul. 8, 2025

(54) IMAGE PROCESSING SYSTEM, IMAGING SYSTEM, IMAGE PROCESSING METHOD, AND NON-TRANSITORY COMPUTER-READABLE MEDIUM

(71) Applicant: NEC Corporation, Tokyo (JP)

(72) Inventors: Yuka Ogino, Tokyo (JP); Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/910,056

(22) PCT Filed: Mar. 27, 2020

(86) PCT No.: PCT/JP2020/014282
§ 371 (c)(1),
(2) Date: Sep. 8, 2022

(87) PCT Pub. No.: WO2021/192295
PCT Pub. Date: Sep. 30, 2021

(65) Prior Publication Data
US 2023/0147924 A1    May 11, 2023

(51) Int. Cl.
*G06V 40/18* (2022.01)
*G06V 10/26* (2022.01)
(Continued)

(52) U.S. Cl.
CPC ............ *G06V 40/193* (2022.01); *G06V 10/26* (2022.01); *G06V 10/60* (2022.01); *H04N 23/56* (2023.01)

(58) Field of Classification Search
None
See application file for complete search history.

(56) References Cited

U.S. PATENT DOCUMENTS

| 2005/0249385 A1 | 11/2005 | Kondo et al. |
| 2005/0270386 A1 | 12/2005 | Saitoh et al. |

(Continued)

FOREIGN PATENT DOCUMENTS

| CN | 110084191 A | * 8/2019 | ............ G06N 3/045 |
| JP | 2005-334402 A | 12/2005 | |

(Continued)

OTHER PUBLICATIONS

JP Office Action for JP Application No. 2022-510393, mailed on Sep. 5, 2023 with English Translation.

(Continued)

*Primary Examiner* — Chan S Park
*Assistant Examiner* — Promotto Tajrian Islam

(57) ABSTRACT

An image processing system includes a detection unit, an identification unit, and a feature extraction unit. The detection unit detects, from a first image in which a target person is captured, a candidate region being an image region estimated to represent an eye of the target person, based on a first evaluation value. The identification unit identifies, from the detected candidate region, an eye region being an image region that represents the eye, based on a second evaluation value. The feature extraction unit extracts a feature value of the identified eye region. The first evaluation value indicates a likelihood of the eye, and is calculated for an image region being set based on the first image. The second evaluation value indicates a likelihood of the eye, and is calculated for an image region being set based on the detected candidate region.

20 Claims, 21 Drawing Sheets

(51) Int. Cl.
*G06V 10/60* (2022.01)
*H04N 23/56* (2023.01)

(56) References Cited

U.S. PATENT DOCUMENTS

| | | | | |
|---|---|---|---|---|
| 2017/0330026 A1* | 11/2017 | Yu | ................. | G06V 40/165 |
| 2017/0330042 A1* | 11/2017 | Vaziri | ................. | G02B 27/0093 |
| 2020/0098136 A1* | 3/2020 | Yokoyama | ................. | G06V 10/46 |
| 2020/0150426 A1* | 5/2020 | Hatzilias | ................. | H05K 3/027 |

FOREIGN PATENT DOCUMENTS

| | | | |
|---|---|---|---|
| JP | 2008-006149 A | 1/2008 | |
| JP | 2017-202038 A | 11/2017 | |
| WO | 2005/109344 A1 | 11/2005 | |
| WO | WO-2009016846 A1 * | 2/2009 | ......... G06K 9/00597 |

OTHER PUBLICATIONS

International Search Report for PCT Application No. PCT/JP2020/014282, mailed on Jun. 9, 2020.

* cited by examiner

IMAGE PROCESSING SYSTEM, IMAGING SYSTEM, IMAGE PROCESSING METHOD, AND NON-TRANSITORY COMPUTER-READABLE MEDIUM

This application is a National Stage Entry of PCT/JP2020/014282 filed on Mar. 27, 2020, the contents of all of which are incorporated herein by reference, in their entirety.

TECHNICAL FIELD

This disclosure relates to an image processing system, an imaging system, an image processing method, and a non-transitory computer-readable medium.

BACKGROUND ART

Biometric authentication (iris authentication) using an iris included in an eye has been known. In the biometric authentication, a feature value of an image region that represents an iris of a target person being included in a captured image of the target person is extracted, and the extracted feature value is registered in a database. For example, Patent Literature 1 discloses an iris authentication system that selects a feature value having a relatively high degree of authentication performance from a plurality of iris images being captured under different illumination conditions by using a camera, and registers the feature value.

CITATION LIST

Patent Literature

[Patent Literature 1] International Patent Publication No. WO2005/109344

SUMMARY OF INVENTION

Technical Problem

This disclosure is to improve the technique described above.

Solution to Problem

An image processing system according to a first aspect of this disclosure includes a detection unit, an identification unit, and a feature extraction unit. The detection unit detects, from a first image in which a target person is captured, a candidate region being an image region estimated to represent an eye of the target person, based on a first evaluation value. The identification unit identifies, from the detected candidate region, an eye region being an image region that represents the eye, based on a second evaluation value. The feature extraction unit extracts a feature value of the identified eye region. The first evaluation value indicates a likelihood of the eye, and is calculated for an image region being set based on the first image. The second evaluation value indicates a likelihood of the eye, and is calculated for an image region being set based on the detected candidate region.

An imaging system according to a second aspect of this disclosure includes an imaging device, and an image processing device. The imaging device captures an image of a target person, and generates a first image. The image processing device includes: a detection unit configured to detect, from the first image, a candidate region being an image region estimated to represent an eye of the target person, based on a first evaluation value; an identification unit configured to identify, from the detected candidate region, an eye region being an image region that represents the eye, based on a second evaluation value; and a feature extraction unit configured to extract a feature value of the identified eye region. The first evaluation value indicates a likelihood of the eye, and is calculated for an image region being set based on the first image. The second evaluation value indicates a likelihood of the eye, and is calculated for an image region being set based on the detected candidate region.

An image processing method according to a third aspect of this disclosure includes a detection step, an identification step, and a feature extraction step. The detection step detects, from a first image in which a target person is captured, a candidate region being an image region estimated to represent an eye of the target person, based on a first evaluation value. The identification step identifies, from the detected candidate region, an eye region being an image region that represents the eye, based on a second evaluation value. The feature extraction step extracts a feature value of the identified eye region. The first evaluation value indicates a likelihood of the eye, and is calculated for an image region being set based on the first image. The second evaluation value indicates a likelihood of the eye, and is calculated for an image region being set based on the detected candidate region.

A non-transitory computer-readable medium according to a fourth aspect of this disclosure stores an image processing program causing a computer to execute an image processing method including a detection step, an identification step, and a feature extraction step. The detection step detects, from a first image in which a target person is captured, a candidate region being an image region estimated to represent an eye of the target person, based on a first evaluation value. The identification step identifies, from the detected candidate region, an eye region being an image region that represents the eye, based on a second evaluation value. The feature extraction step extracts a feature value of the identified eye region. The first evaluation value indicates a likelihood of the eye, and is calculated for an image region being set based on the first image. The second evaluation value indicates a likelihood of the eye, and is calculated for an image region being set based on the detected candidate region.

EXAMPLE EMBODIMENT

This disclosure will be described below with reference to example embodiments, but the disclosure in the claims is not limited to the example embodiments below. Further, all configurations described in the example embodiments are not necessarily essential as a means for solving the problem. For clarification of the description, the description and the drawings below are appropriately omitted and simplified. Note that, in each of the drawings, the same elements will be denoted by the same reference signs, and duplicate description will be omitted as necessary.

First Example Embodiment

Figure 1:
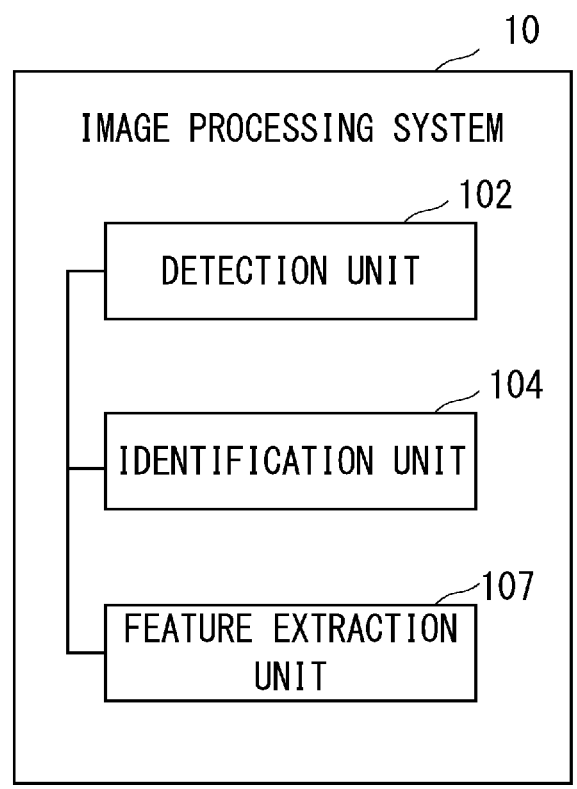
FIG. 1 is a block diagram illustrating a configuration of an image processing system according to a first example embodiment.
Figure 2:
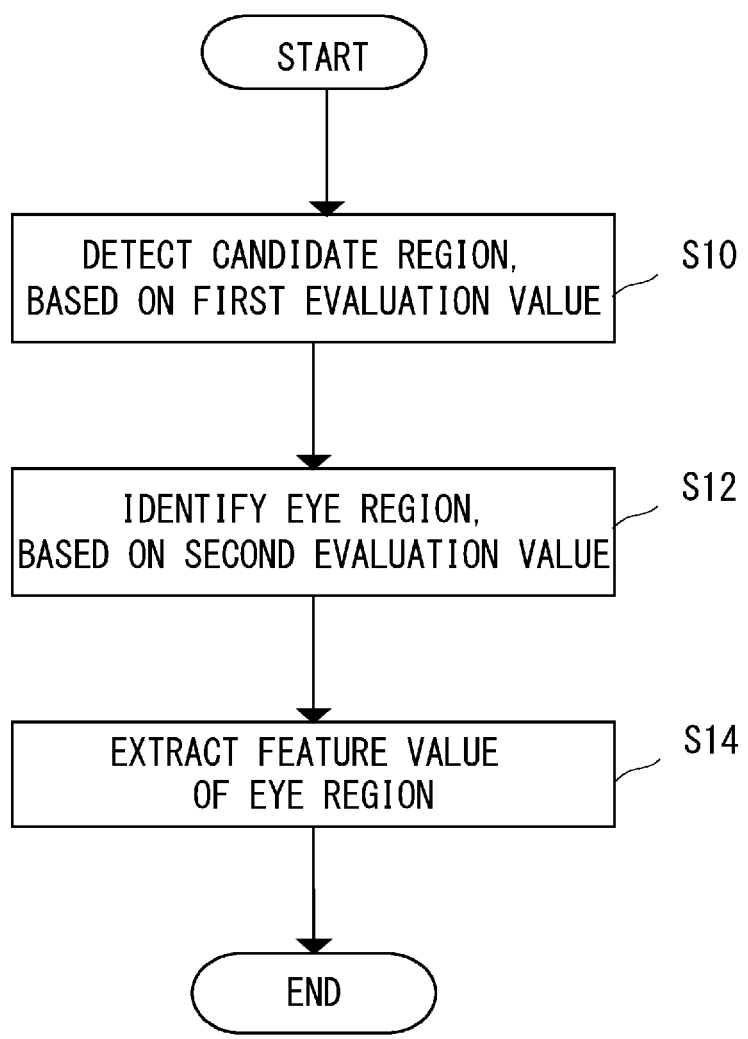
FIG. 2 is a flowchart illustrating processing of the image processing system according to the first example embodiment.

First, a first example embodiment according to this disclosure will be described by using FIGS. 1 to 2. FIG. 1 is a block diagram illustrating a configuration of an image processing system 10 according to the first example embodiment. The image processing system 10 includes a detection unit 102, an identification unit 104, and a feature extraction unit 107.

The detection unit 102 detects a candidate region from a first image in which a target person is captured, based on a first evaluation value. Here, the first evaluation value indicates a likelihood of an eye, and is calculated for an image region being set based on the first image. Further, the candidate region is an image region being estimated to represent the eye of the target person.

The identification unit 104 identifies, from the detected candidate region, an eye region being an image region that represents the eye, based on a second evaluation value. Here, the second evaluation value indicates a likelihood of the eye, and is calculated for an image region being set based on the detected candidate region. Further, the eye region is an image region that represents the eye.

The feature extraction unit 107 extracts a feature value of the identified eye region.

Next, an image processing method of the image processing system 10 will be described by using FIG. 2. FIG. 2 is a flowchart illustrating processing of the image processing system 10 according to the first example embodiment.

Next, in step S10, the detection unit 102 detects a candidate region from a first image in which a target person is captured, based on a first evaluation value.

Next, in step S12, the identification unit 104 identifies an eye region from the detected candidate region, based on a second evaluation value.

Then, in step S14, the feature extraction unit 107 extracts a feature value of the identified eye region.

Here, in the method described in Patent Literature 1 described above, authentication performance of a feature value being registered in a database is determined to be relatively excellent between feature values being extracted from a plurality of captured images. Then, when imaging is performed under a condition such as a long distance between a target person and a camera, a wide capturing visual field of a camera, or a target person who is moving, an acquired captured image may include many portions other than an eye. In such a case, in the method described in Patent Literature 1 described above, authentication performance of a feature value to be registered may decrease.

However, according to the configuration of the present first example embodiment, the image processing system 10 identifies an eye region, based on different evaluation values at two stages indicating a likelihood of an eye. Therefore, even when an image region that represents a portion other than an eye is included in a first image being captured, extraction of a false feature value and registration can be avoided. In this way, authentication performance when authentication processing is performed by using a registered feature value can be improved.

Second Example Embodiment

Figure 3:
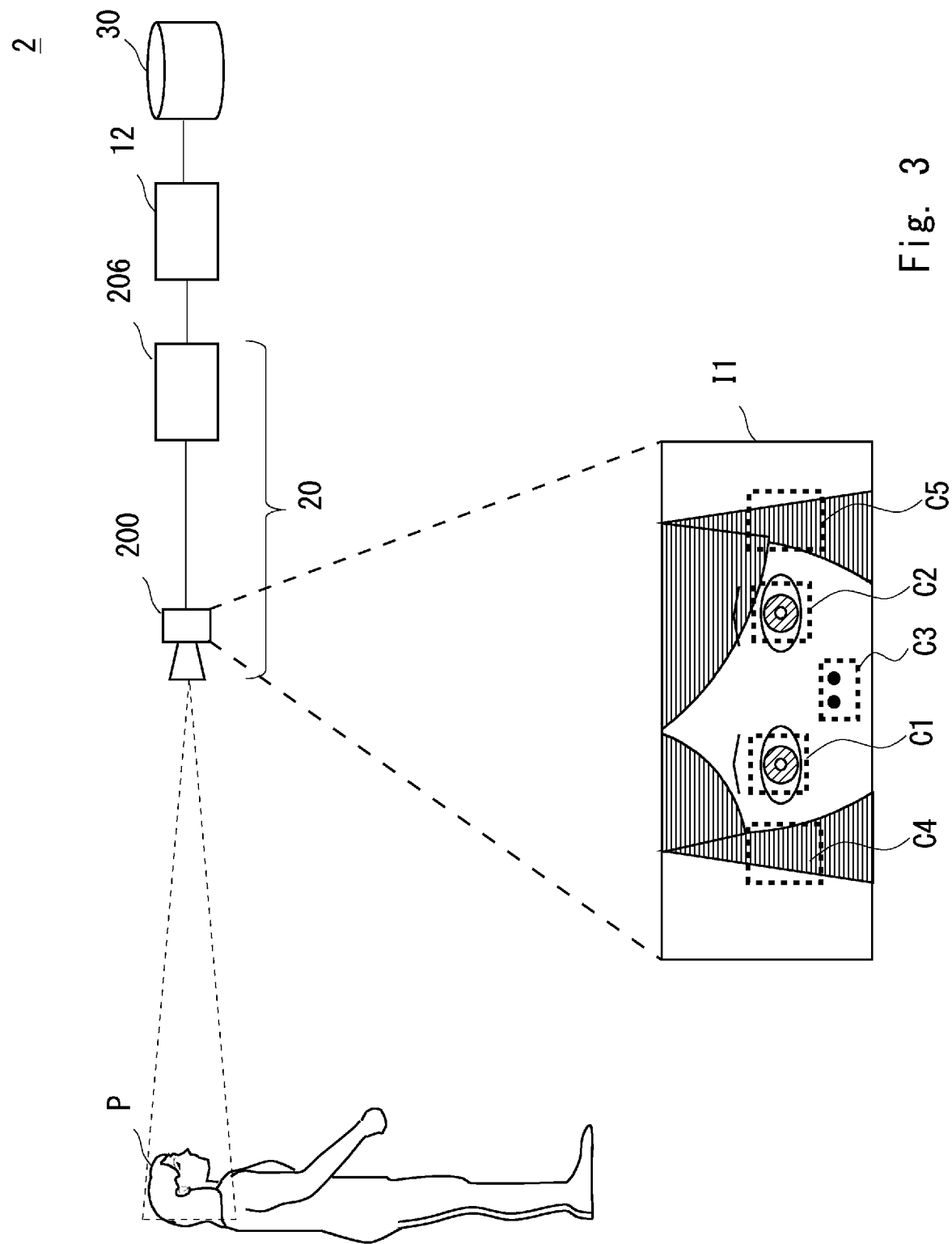
FIG. 3 is a schematic configuration diagram of an imaging system according to a second example embodiment.

Next, a second example embodiment according to this disclosure will be described by using FIGS. 3 to 6. FIG. 3 is a schematic configuration diagram of an imaging system 2 according to the second example embodiment. The imaging system 2 is a computer system for performing biometric authentication, and captures a region of interest including an eye of a target person P, extracts a feature value being biometric authentication information included in the captured image, and registers the extracted feature value. Here, the biometric authentication is iris authentication in the present second example embodiment. The imaging system 2 includes an imaging device 20, an image processing system (hereinafter referred to as an image processing device) 12, and a database 30.

The imaging device 20 is a computer that captures the target person P and generates a first image I1 being a captured image, or the like. The imaging device 20 includes an imaging instrument 200 and a control unit 206.

The imaging instrument 200 is a camera for capturing an eye, particularly, an iris of the target person P, and generating the first image I1. The imaging instrument 200 includes an imaging element such as a charge coupled device (CCD) and a complementary metal oxide semiconductor (CMOS) element. An imaging surface of the imaging instrument 200 includes a pixel array in which a photoelectric transducer (not illustrated) that converts an optical image of the target person P into an electric signal is two-dimensionally arrayed. In the present second example embodiment, the imaging instrument 200 may be formed of a general-purpose camera of 12 M pixels (horizontal 4000 pixels, vertical 3000 pixels) and 60 fps, which is becoming a diffused product, such as an industrial camera.

The imaging instrument 200 is installed in such a way as to be able to suitably capture a region of interest including an eye of the target person P located in a capture volume.

The control unit 206 is connected to the imaging instrument 200, and performs control of an imaging operation of the imaging instrument 200. Further, the control unit 206 acquires the first image I1 from the imaging instrument 200, and supplies the first image I1 to the image processing device 12.

The image processing device 12 is a computer that extracts a feature value of an eye, particularly, an iris of the target person P from the first image I1, or the like. The image processing device 12 registers the extracted feature value in the database 30.

Here, as illustrated in FIG. 3, at least a part of a body including an eye of the target person P is captured in the first image I1 generated by the imaging instrument 200. For example, when imaging is performed under a condition such as a long distance between the target person P and the imaging instrument 200, a wide capturing visual field of the imaging instrument 200, or the target person P who is moving, the first image I1 may include an image region that represents a portion other than an eye in addition to or instead of the eye. As one example, an image region that represents hair has a pixel value similar to that of an iris and a pupil of an eye. Further, in a pixel region that represents a hole of a nose, a pixel of a pixel value similar to that of an iris and a pupil forms a substantially circular shape similar to the iris and the pupil. Therefore, when the image processing device 12 detects an eye region from the first image I1, the image that represents the portions may also be estimated to represent an eye and may be detected by mistake.

In the present second example embodiment, when a candidate region being an image region estimated to represent an eye of the target person P is detected from the first image I1, the image processing device 12 identifies an eye region being an image region that represents the eye of the target person P from the candidate region. Hereinafter, a case where the image processing device 12 detects a plurality of candidate regions (C1 to C5 in FIG. 3) from the first image I1 will be described, but the same also applies to a case where the image processing device 12 detects one candidate region from the first image I1.

Note that the database 30 is a storage medium that is connected to the image processing device 12 and stores a feature value of an eye, particularly, an iris of the target person P being used for biometric authentication.

Figure 4:
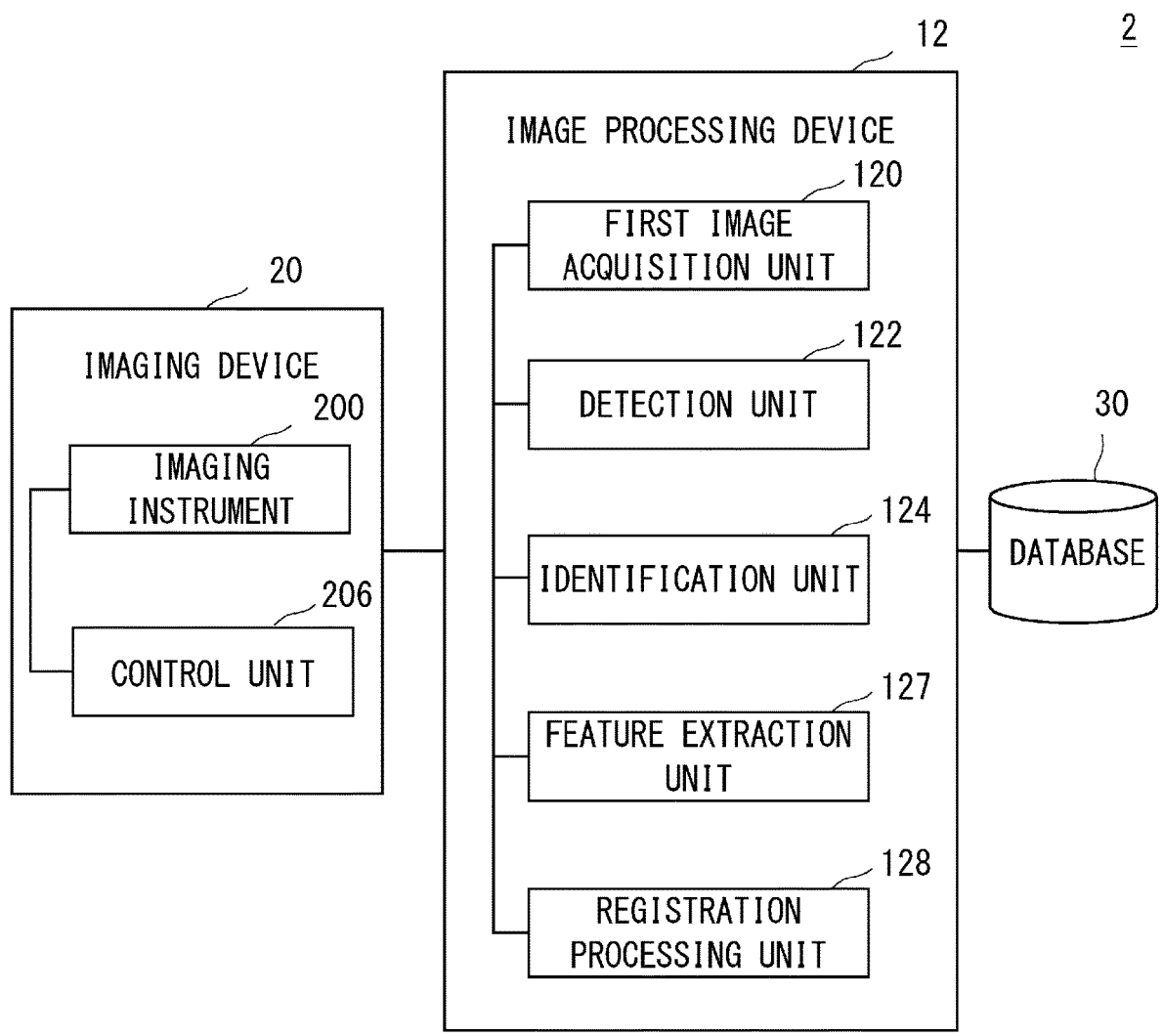
FIG. 4 is a block diagram illustrating a configuration of the imaging system according to the second example embodiment.

FIG. 4 is a block diagram illustrating the configuration of the imaging system 2 according to the second example embodiment. As described above, the imaging system 2 includes the image processing device 12, the imaging device 20, and the database 30. The description of the imaging device 20 and the database 30 will be omitted.

The image processing device 12 includes a first image acquisition unit 120, a detection unit 122, an identification unit 124, a feature extraction unit 127, and a registration processing unit 128.

The first image acquisition unit 120 acquires the first image I1 from the control unit 206 of the imaging device 20. The first image I1 is a captured image in which at least a part of a body of the target person P is captured. The first image acquisition unit 120 supplies the acquired first image I1 to the detection unit 122.

The detection unit 122 calculates a first evaluation value indicating a likelihood of an eye for each first evaluation target region being an image region of an evaluation target. The first evaluation target region is an image region being set based on the first image I1. Here, in the present second example embodiment, the first evaluation target region is an image region being set in the first image I1. However, instead of this, the first evaluation target region may be an image region being set in an image generated by converting the first image I1 in such a way as to have a predetermined pixel number.

Here, the detection unit 122 calculates, for each first evaluation target region, a first evaluation value, based on a distribution of a pixel value of a pixel included in the region. The pixel value includes a brightness value, luminosity, or the like. Then, the detection unit 122 detects a plurality of candidate regions from the first image I1, based on the first evaluation value. The detection unit 122 supplies information about the plurality of detected candidate regions to the identification unit 124.

The identification unit 124 sets each of the plurality of detected candidate regions as a new evaluation target, and calculates a second evaluation value indicating a likelihood of an eye for each second evaluation target region being an image region of the evaluation target. The second evaluation target region is an image region being set based on the detected candidate region. The second evaluation target region may be each candidate region, or may be an extraction region being an image region according to each candidate region included in the first image I1. Further, the second evaluation target region may be an image region being set in an image generated by converting each candidate region or each extraction region in such a way as to have a predetermined pixel number.

Here, the identification unit 124 calculates, for each second evaluation target region, a second evaluation value, based on a distribution of a pixel value of a pixel included in the region. Therefore, a difference is that the first evaluation value is an evaluation value being calculated for an image region set based on the first image I1, whereas the second evaluation value is an evaluation value being calculated for an image region set based on a detected candidate region.

Then, the identification unit 124 identifies an eye region from one or a plurality of candidate regions, based on such a second evaluation value. The identification unit 124 supplies information about the identified eye region to the feature extraction unit 127.

The feature extraction unit 127 extracts a feature value of the identified eye region by a predetermined method.

The registration processing unit 128 is connected to the database 30, and performs processing of registering information about the feature value of the eye region in the database 30.

Figure 5:
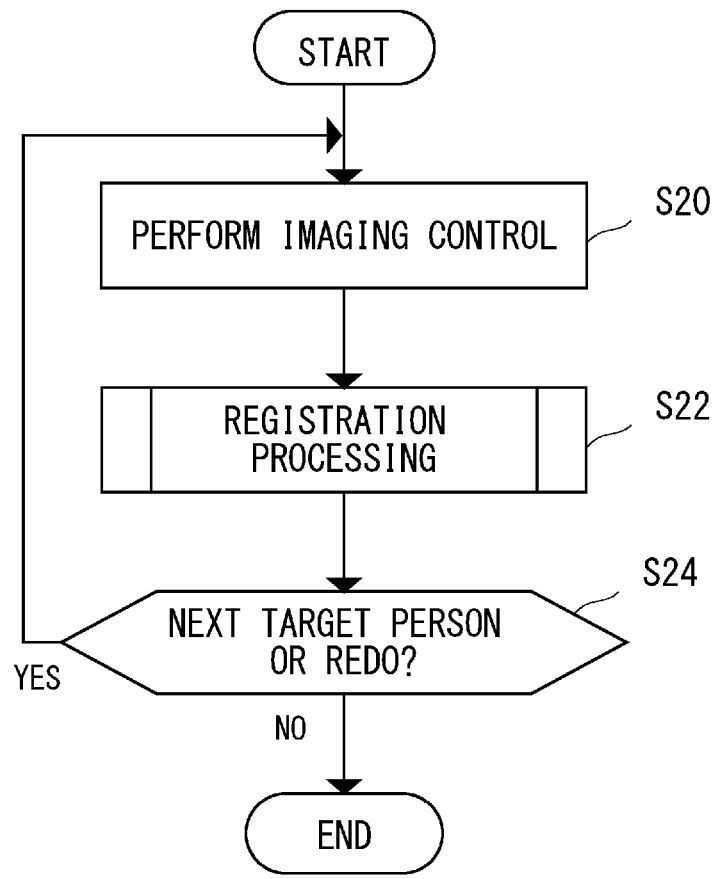
FIG. 5 is a flowchart illustrating processing of the imaging system according to the second example embodiment.

FIG. 5 is a flowchart illustrating processing of the imaging system 2 according to the second example embodiment.

First, in step S20, the control unit 206 of the imaging device 20 of the imaging system 2 controls the imaging instrument 200, and causes the imaging instrument 200 to perform an operation of capturing at least a part of a body including an eye of the target person P. The imaging instrument 200 generates the first image I1 being a captured image, and supplies the first image I1 to the control unit 206. Then, the control unit 206 transmits the first image I1 to the image processing device 12.

Next, in step S22, the image processing device 12 performs registration processing of a feature value described below, based on the first image I1, and registers the feature value in the database 30.

Next, in step S24, the control unit 206 of the imaging device 20 determines whether there is a next target person P or whether to perform re-registration. When the control unit 206 determines that there is a next target person P or re-registration is performed (step S24: YES), the control unit 206 returns the processing to step S20, and, when the control unit 206 does not determine that described above (NO in step S24), the control unit 206 ends the processing.

Figure 6:
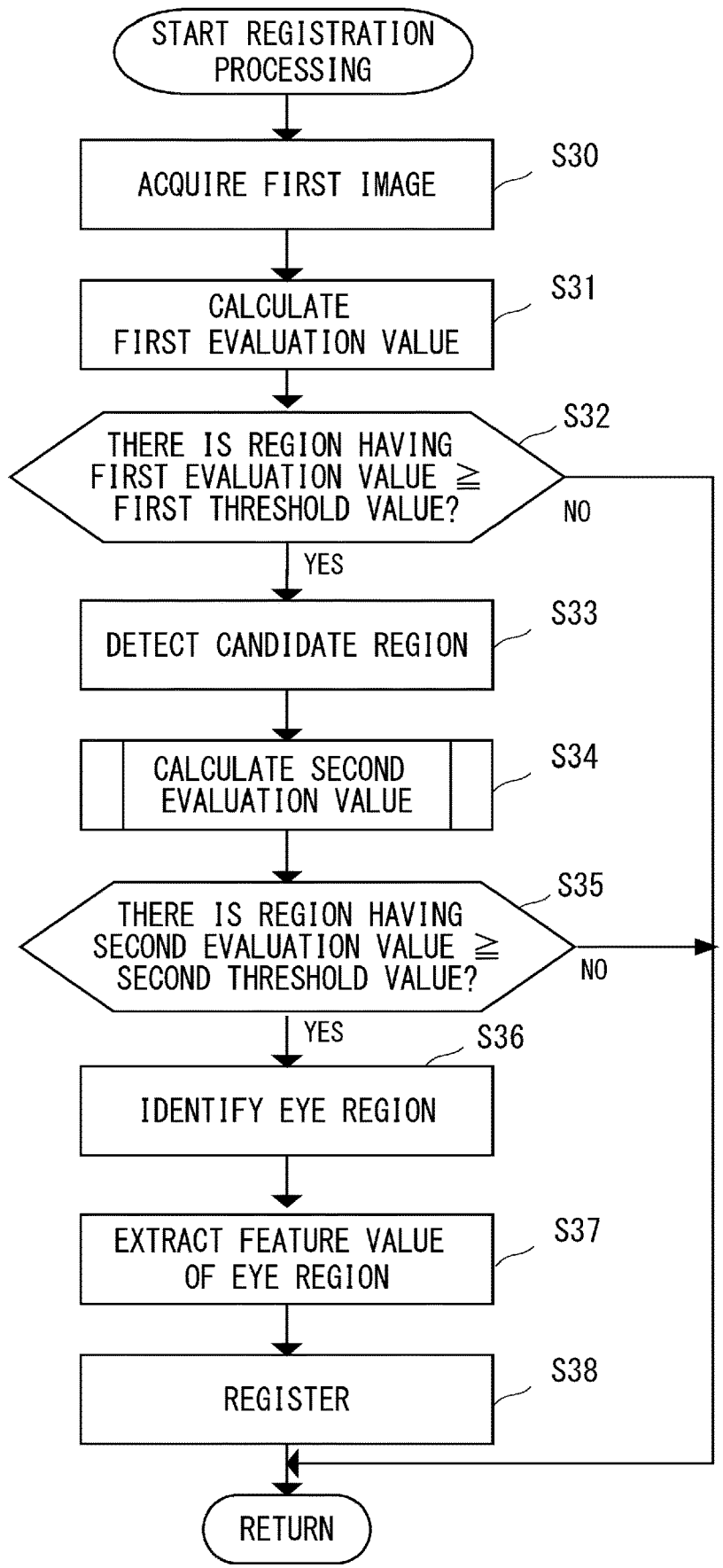
FIG. 6 is a flowchart illustrating registration processing of an image processing device according to the second example embodiment.

Next, the registration processing of the image processing device 12 in step S22 illustrated in FIG. 5 will be described by using FIG. 6. FIG. 6 is a flowchart illustrating the registration processing of the image processing device 12 according to the second example embodiment.

First, in step S30, the first image acquisition unit 120 of the image processing device 12 acquires the first image I1 from the control unit 206 of the imaging device 20. The first image acquisition unit 120 supplies the first image I1 to the detection unit 122.

Next, in step S31, the detection unit 122 sets a plurality of first evaluation target regions, based on the first image I1, and calculates a first evaluation value for each of the first evaluation target regions. Calculation processing of a first evaluation value may be performed by using any technique in object detection.

One example of the technique is indicated below.
(First Evaluation Value Calculation Technique 1)

For example, the detection unit 122 performs binary processing and the like on the first image I1, and classifies pixels included in the first image I1 into pixels having a pixel value equal to or more than a predetermined threshold value and the other pixels. Then, the detection unit 122 performs, for each of the first evaluation target regions, thinning processing, Hough transform, and the like on the pixels having the pixel value equal to or more than the predetermined threshold value, and calculates a degree of coincidence between a shape formed by the pixels having the pixel value equal to or more than the predetermined threshold value and a predetermined substantially circular shape. The predetermined substantially circular shape may be determined according to a shape of an iris and a pupil, particularly, a pupil of a person.
(First Evaluation Value Calculation Technique 2)

For example, the detection unit 122 calculates, for each of the first evaluation target regions, a degree of coincidence with a template having a pixel value distribution of a predetermined substantially circular shape.
(First Evaluation Value Calculation Technique 3)

For example, the detection unit 122 scans the first image I1 by a search window in a predetermined size, and calculates a first evaluation value, based on a combination of a light and darkness difference in the search window, a combination of a brightness distribution, a combination of a distribution in a gradient direction of brightness, or the like. In this case, an image region overlapping the search window on the first image I1 is a first evaluation target region. Then, the first evaluation value may be based on a Haar-Like feature value, a Local Binary Pattern (LBP) feature value, or a Histogram of Oriented Gradients (HOG) feature value in such a first evaluation target region.
(First Evaluation Value Calculation Technique 4)

For example, the detection unit 122 predicts a feature value for a first evaluation target region by using a learned convolutional neural network (CNN) with the first image I1 or the above-described conversion image of the first image I1 as an input. Here, the CNN may include a single shot multibox detector (SSD). In this case, the first evaluation target region corresponds to a default box being set in an input image.

Next, in step S32, the detection unit 122 determines whether there is a first evaluation target region having a first evaluation value equal to or more than a predetermined threshold value (first threshold value). When the detection unit 122 determines that there is the first evaluation target region (step S32: YES), the detection unit 122 proceeds the processing to step S33, and, when the detection unit 122 does not determine that described above (step S32: NO), the detection unit 122 ends the processing.

In step S33, the detection unit 122 determines that the first evaluation target region having the first evaluation value equal to or more than the first threshold value is a candidate region. In this way, the detection unit 122 detects a plurality of candidate regions. Then, the detection unit 122 supplies information about the plurality of candidate regions to the identification unit 124.

Next, in step S34, the identification unit 124 sets, for each of the candidate regions, an image region based on the candidate region as a second evaluation target region, and calculates a second evaluation value for the second evaluation target region. Here, the image region based on the candidate region may be a candidate region, an extraction region, or an image region generated by converting a candidate region or an extraction region in such a way as to have a predetermined pixel number.

For example, in the second example embodiment, the identification unit 124 may calculate a second evaluation value by using a technique that is not adopted for the first evaluation value calculation processing by the detection unit 122 in step S31 among the first evaluation value calculation techniques 1 to 4 indicated in step S31 described above. However, at this time, the "detection unit 122" is replaced with the "identification unit 124", the "first image I1" and the "first evaluation target region" are replaced with the "second evaluation target region", and the "first evaluation value" is replaced with the "second evaluation value".

Further, for each second evaluation target region, the identification unit 124 may calculate, as a second evaluation value, a degree of a focus of an image region associated with an iris and a pupil, particularly, a pupil portion of a person being detected by the detection unit 122 in steps S31 to S33. Specifically, for each second evaluation target region, the identification unit 124 may calculate a frequency spectrum distribution by using a fast Fourier transform for a brightness level, and may calculate a second evaluation value, based on spectrum strength in a predetermined frequency region. Further, the identification unit 124 may calculate a second evaluation value, based on a value acquired by performing Laplacian differentiation on a brightness value, for each second evaluation target region.

Next, in step S35, the identification unit 124 determines whether there is a second evaluation target region having a second evaluation value equal to or more than a predetermined threshold value (second threshold value). When the identification unit 124 determines that there is the second evaluation target region (step S35: YES), the identification unit 124 proceeds the processing to step S36, and, when the identification unit 124 does not determine that described above (step S35: NO), the identification unit 124 ends the processing.

Next, in step S36, the identification unit 124 identifies, as an eye region, a candidate region associated with the second evaluation target region having the second evaluation value equal to or more than the second threshold value. Then, the identification unit 124 supplies information about the identified eye region to the feature extraction unit 127.

Next, in step S37, the feature extraction unit 127 extracts a feature value of the eye region. For example, the feature extraction unit 127 calculates a feature value of the identified eye region by using a learned CNN that outputs a feature value vector used for biometric authentication from an input image. Note that the input image may be an image of the identified eye region. The feature extraction unit 127 supplies information about the calculated feature value of the eye region to the registration processing unit 128.

Then, in step S38, the registration processing unit 128 registers the information about the feature value of the eye region in the database 30.

Note that the second evaluation value may be an index that evaluates a degree of suitability of a detection result of the detection unit 122 as an eye for extracting iris authentication information. In step S37, when the feature extraction unit 127 extracts a feature value related to iris authentication information, it is desired that the center of an image region associated with a pupil portion is disposed in a position as close to the center of an input image as possible. At this time, in step S34, for each second evaluation target region, the identification unit 124 may calculate, as a second evaluation value, a distance between the center of the image region associated with an iris and a pupil, particularly, a pupil portion being detected by the detection unit 122 in steps S31 to S33 and the center of the second evaluation target region. At this time, the identification unit 124 may use a learned CNN that predicts the distance. Since the CNN can be achieved by a light configuration, the image processing device 12 can perform highly accurate feature value extraction while reducing a calculation cost.

Further, the image processing device 12 may perform not only registration processing of a feature value but also update processing of a feature value. In this case, instead of step S38, the registration processing unit 128 updates the information about the feature value of the eye region as a record of the target person P included in the database 30. Further, the image processing device 12 may perform authentication processing, based on an extracted feature value. In this case, instead of step S38, the registration processing unit 128 performs the authentication processing by verifying the extracted feature value with a feature value being stored in the database 30, and determining whether there is a coinciding feature value.

In this way, according to the second example embodiment, the image processing device 12 identifies an eye region, based on different evaluation values at two stages indicating a likelihood of an eye. Therefore, in a case where imaging is performed under a condition of a wide capturing visual field of a camera and the like, even when an image region that represents a portion other than an eye is included in a first image being captured, extraction of a false feature value and registration can be avoided. In this way, authentication performance when the authentication processing is performed by using a registered feature value can be improved.

Further, the image processing device 12 according to the second example embodiment automatically performs calculation of evaluation values at two stages. Thus, whether a detected region is an eye does not need to be checked by an operator, and a load on the operator can be reduced. Further, in this way, real time property of the registration processing can be ensured.

Third Example Embodiment

Next, a third example embodiment according to this disclosure will be described by using FIGS. 7 to 8. The third example embodiment has a characteristic that a candidate region or a second evaluation target region is displayed on a display unit. An imaging system 2 according to the third example embodiment has a configuration and a function similar to those of the imaging system 2 according to the second example embodiment, and an image processing device 12 according to the third example embodiment is a computer having a configuration and a function similar to those of the image processing device 12 according to the second example embodiment, or the like. However, the image processing device 12 according to the third example embodiment is different from the second example embodiment in a point that the image processing device 12 according to the third example embodiment further includes a display unit that displays a candidate region or a second evaluation target region in registration processing.

Figure 7:
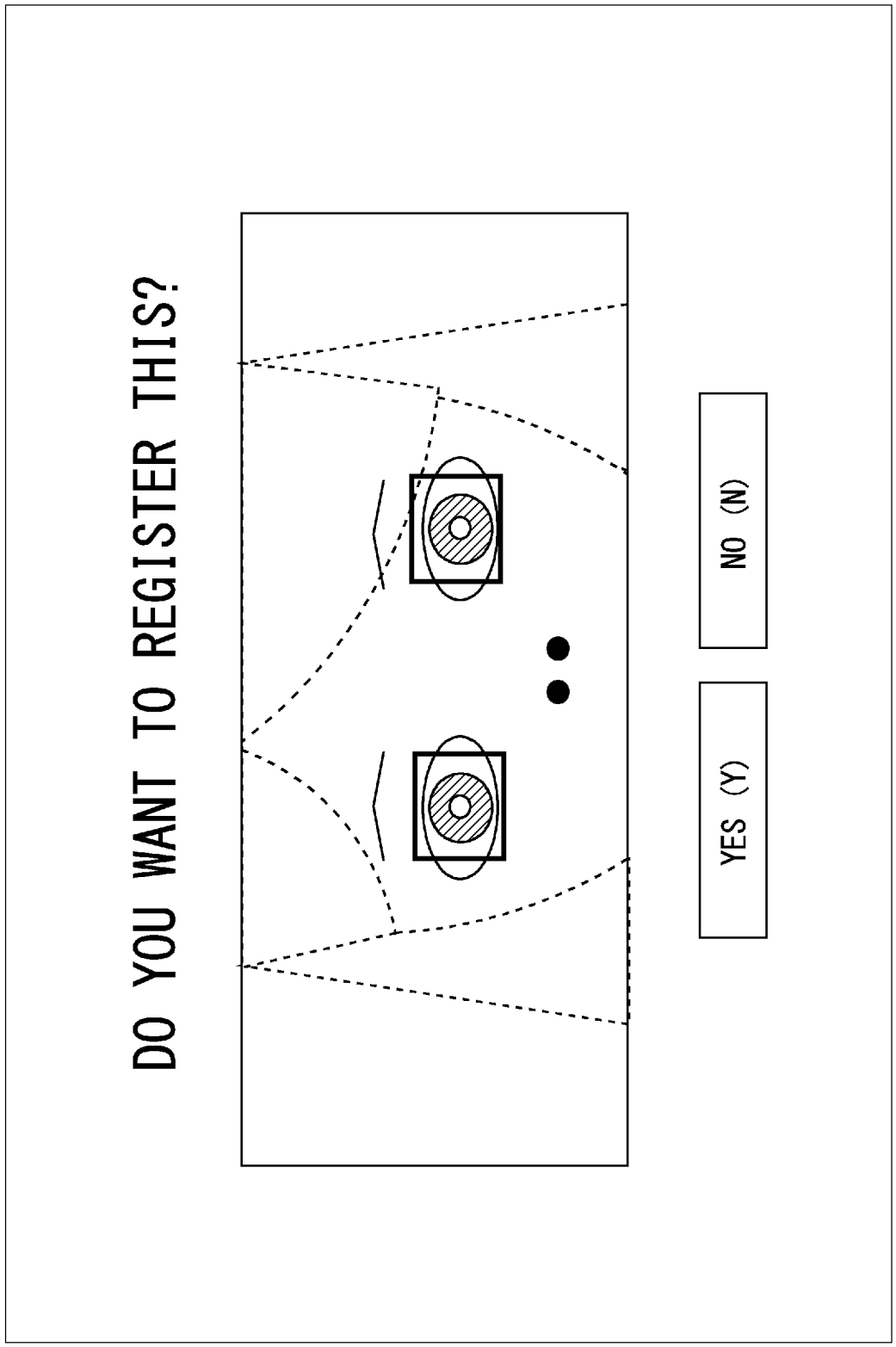
FIG. 7 is a diagram for describing one example of display in registration processing of an image processing device according to a third example embodiment.
Figure 8:
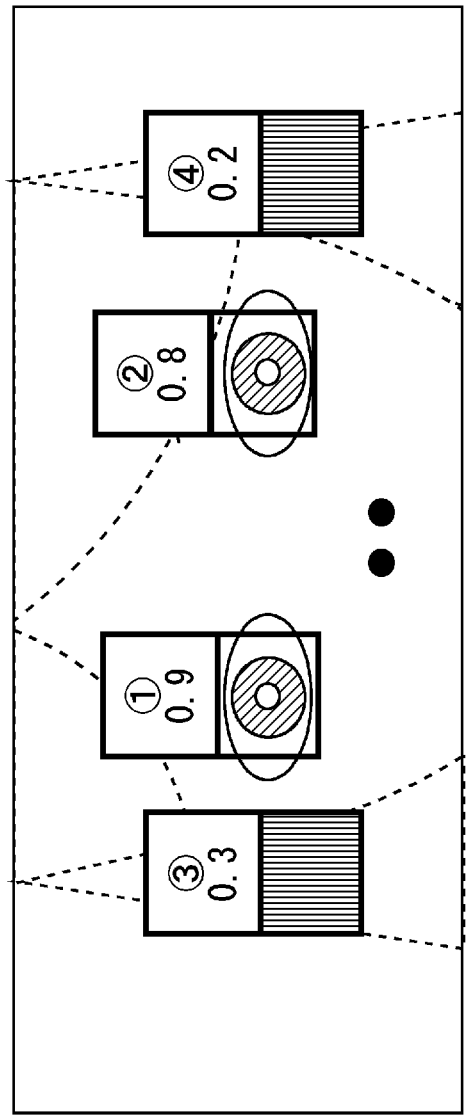
FIG. 8 is a diagram for describing one example of display in the registration processing of the image processing device according to the third example embodiment.

FIGS. 7 and 8 are diagrams for describing one example of display in the registration processing of the image processing device 12 according to the third example embodiment.

For example, when it is determined that there is a second evaluation target region having a second evaluation value equal to or more than a second threshold value in step S35 illustrated in FIG. 6, an identification unit 124 causes the display unit to display the second evaluation target region or a candidate region associated with the second evaluation target region as illustrated in FIG. 7, instead of step S36. At this time, the identification unit 124 may prompt an input of whether to register a region displayed for an operator as a feature value of an eye region. The identification unit 124 identifies, as the eye region, a candidate region being the displayed region in response to reception of the input for registration.

Further, instead of step S35 illustrated in FIG. 6, the identification unit 124 causes the display unit to display each candidate region or each second evaluation target region as illustrated in FIG. 8 while providing a number associated with an order of magnitude of an associated second evaluation value. The identification unit 124 may cause the display unit to display a second evaluation value associated with each region instead of or in addition to the number. Then, the identification unit 124 may prompt a selection of an eye region whose feature value is to be registered among regions displayed for an operator. The identification unit 124 identifies, as the eye region, a candidate region being the selected region in response to reception of the selection.

Fourth Example Embodiment

Next, a fourth example embodiment according to this disclosure will be described by using FIGS. 9 to 11. The fourth example embodiment has a characteristic that a second image generated based on an extraction region according to a candidate region is used for calculation of a second evaluation value.

Figure 9:
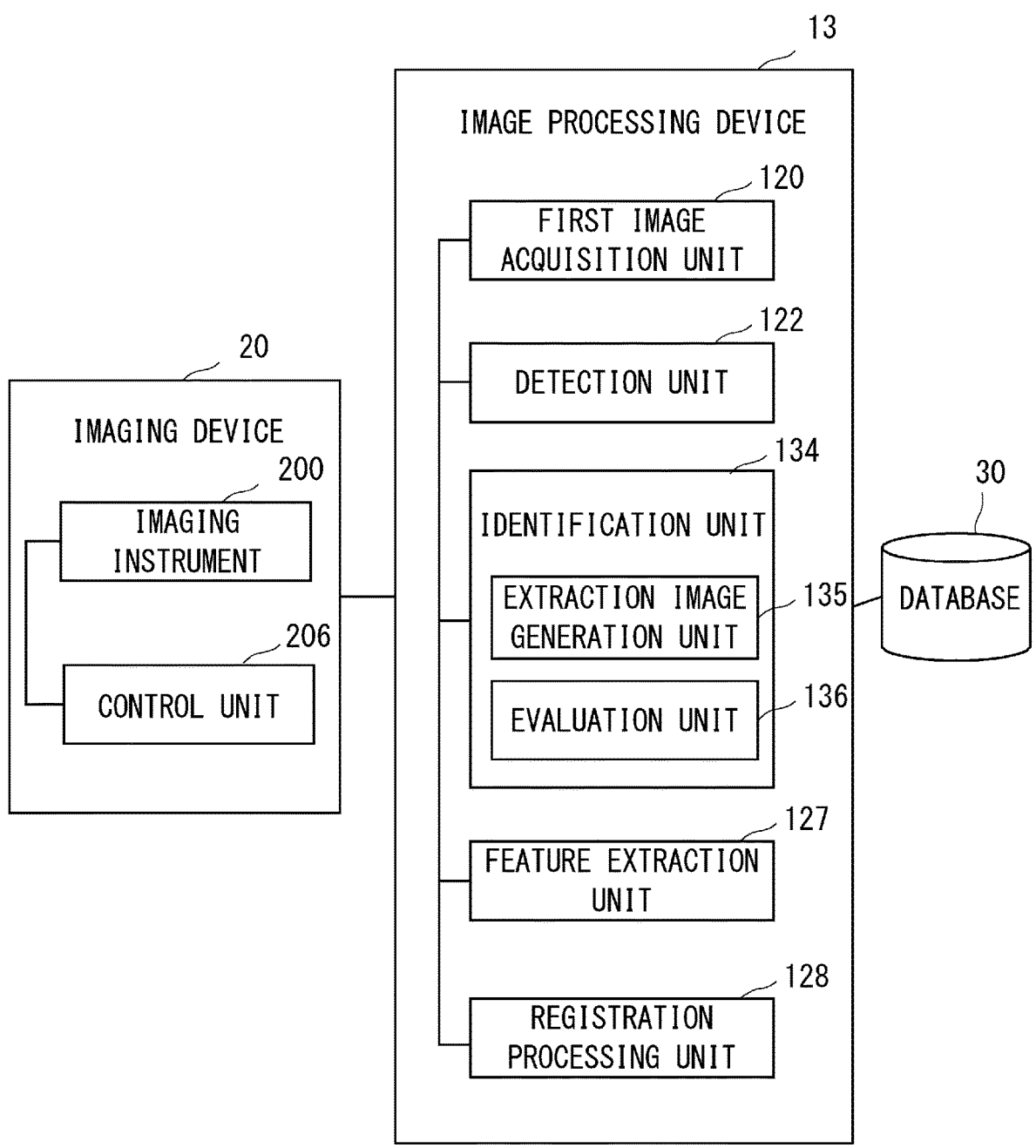
FIG. 9 is a block diagram illustrating a configuration of an imaging system according to a fourth example embodiment.

FIG. 9 is a block diagram illustrating a configuration of an imaging system 3 according to the fourth example embodiment. The imaging system 3 according to the fourth example embodiment basically has a configuration and a function to those of the imaging system 2 according to the second to third example embodiments. However, the imaging system 3 includes an image processing device 13 instead of the image processing device 12.

The image processing device 13 is a computer basically having a configuration and a function similar to those of the image processing device 12, or the like. However, the image processing device 13 includes an identification unit 134 instead of the identification unit 124.

The identification unit 134 basically has a function similar to that of the identification unit 124, but includes an extraction image generation unit 135 and an evaluation unit 136.

The extraction image generation unit 135 cuts an extraction region according to a candidate region from a first image I1, and generates a second image I2, based on the cut extraction region. In other words, in the present fourth example embodiment, the second image I2 is a second evaluation target region. The second image I2 has a predetermined pixel number according to the following eye evaluation model. The extraction image generation unit 135 supplies the second image I2 to the evaluation unit 136.

The evaluation unit 136 calculates a second evaluation value by using a learned eye evaluation model with the second image I2 as input data. In the present fourth example embodiment, the learned eye evaluation model includes a learned CNN that outputs a second evaluation value from the second image I2. The evaluation unit 136 identifies an eye region from one or a plurality of candidate regions, based on the calculated second evaluation value. Then, the evaluation unit 136 supplies information about the identified eye region to a feature extraction unit 127.

Next, by using FIG. 10, second evaluation value calculation processing of the identification unit 134 associated with step S34 illustrated in FIG. 6 will be described with reference to FIG. 11. FIG. 10 is a flowchart illustrating the second evaluation value calculation processing of the image processing device 13 according to the fourth example embodiment. FIG. 11 is a diagram for describing the second evaluation value calculation processing of the image processing device 13 according to the fourth example embodiment. Note that X1, XC1, XE1, XC2, Y1, YC1, YE1, and YC2 described below are all natural numbers.

First, in step S40, the extraction image generation unit 135 of the identification unit 134 of the image processing device 13 identifies an extraction region from the first image I1, and cuts the extraction region. Here, as illustrated in FIG. 11, for example, the first image I1 has a pixel number in a width direction of X1 and a pixel number in a height direction of Y1. Further, a candidate region C1 being one of a plurality of candidate regions has a pixel number in the width direction of XC1 and a pixel number in the height direction of YC1. At this time, the extraction image generation unit 135 identifies, as an extraction region E1 according to the candidate region C1, an image region having a pixel number in the width direction of XE1 (≥XC1) and a pixel number in the height direction of YE1 (≥YC1) around a central point of the candidate region C1. The extraction image generation unit 135 identifies an extraction region similarly for another candidate region.

Next, in step S42, the extraction image generation unit 135 cuts, for each candidate region, the identified extraction region from the first image I1, and generates the second image I2 having a predetermined pixel number by using the cut extraction region. As illustrated in FIG. 11, the second image I2 generated for the candidate region C1 is an image having a pixel number in the width direction of XC2 and a pixel number in the height direction of YC2. XC2 and YC2 may be a predetermined value, for example, 300 according to a learned eye evaluation model. The extraction image generation unit 135 generates the second image I2 by converting the extraction region E1 in such a way that the pixel number is changed from XE1×YE1 to XC2×YC2. In other words, the extraction image generation unit 135 may generate the second image I2 through conversion by enlarging, reducing, extending, or compressing the extraction region E1. For example, when the extraction region E1 is enlarged or reduced, the extraction image generation unit 135 may change an interval between a predetermined pixel and a surrounding pixel that are included in the extraction region E1, and may interpolate a pixel therebetween. Further, when the extraction region E1 is extended, the extraction image generation unit 135 may extend an interval between pixels for pixels in an extending direction, and may interpolate a pixel therebetween. Further when the extraction region E1 is compressed, the extraction image generation unit 135 may reduce an interval between pixels for pixels in a compressing direction, and may appropriately interpolate a pixel.

Note that the extraction image generation unit 135 may appropriately perform normalization processing of a pixel value on the generated second image I2. The normalization processing may include binary processing. Then, the extraction image generation unit 135 supplies the second image I2 to the evaluation unit 136.

Figure 11:
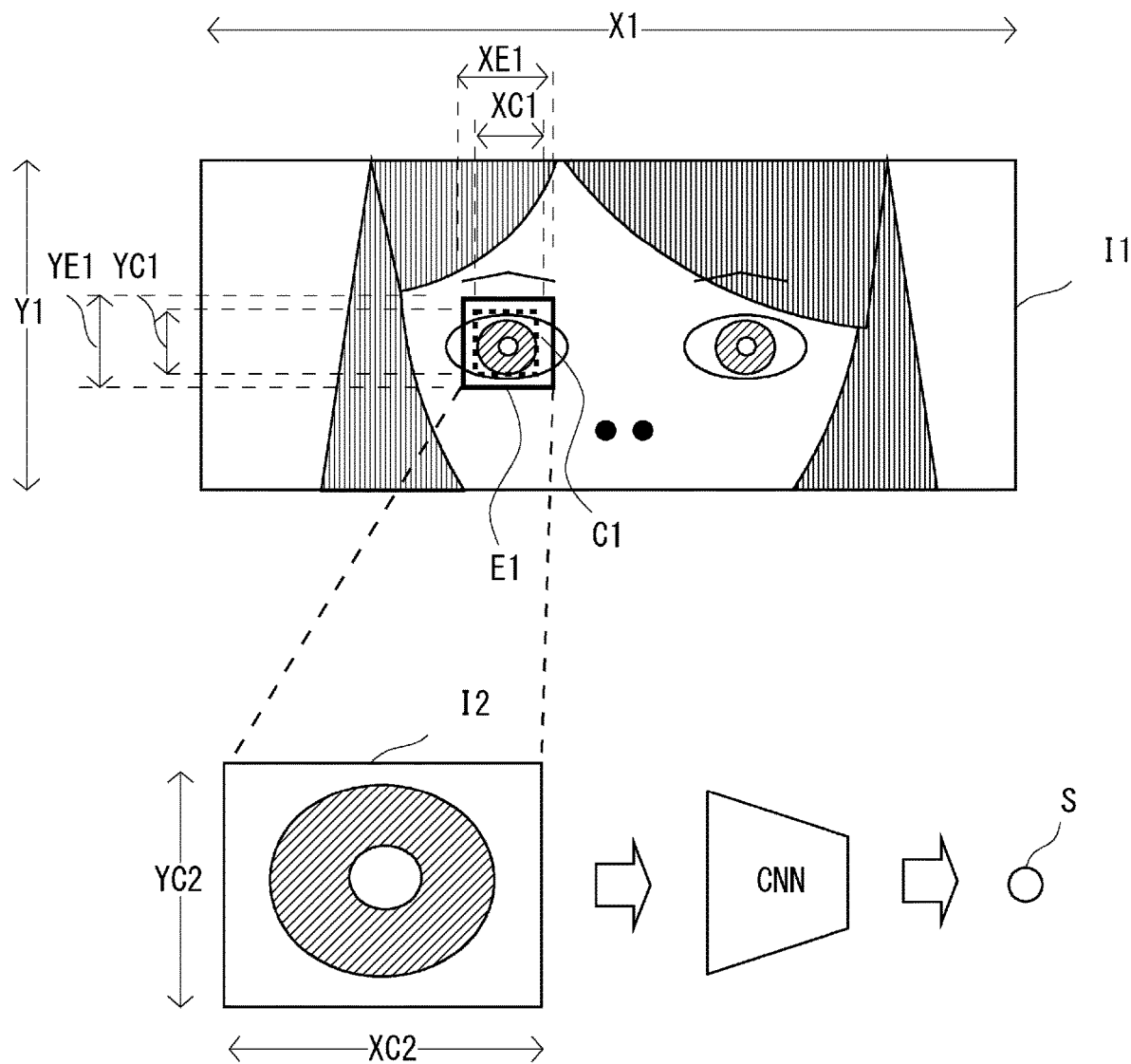
FIG. 11 is a diagram for describing the second evaluation value calculation processing of the image processing device according to the fourth example embodiment.

Next, in step S44, the evaluation unit 136 inputs the second image I2 to an input layer of the CNN of the learned eye evaluation model as illustrated in FIG. 11.

Next, in step S46, the evaluation unit 136 acquires a second evaluation value S from an output layer of the CNN of the learned eye evaluation model as illustrated in FIG. 11. In this way, the evaluation unit 136 calculates the second evaluation value S associated with the candidate region.

Next, in step S48, the evaluation unit 136 determines whether calculation of the second evaluation value S for all candidate regions is completed. When the evaluation unit 136 determines that it is completed (step S48: YES), the evaluation unit 136 ends the processing, and, when the evaluation unit 136 does not determine that described above (step S48: NO), the evaluation unit 136 returns the processing to step S40.

In this way, according to the fourth example embodiment, the image processing device 13 calculates the second evaluation value S from the second image I2 based on an extraction region acquired by eliminating an unnecessary region from the first image I1. Note that the second image I2 is resized to a predetermined image size around the center of the candidate region C, that is, around a pupil. Therefore, a more precise eye evaluation can be performed while suppressing a calculation cost as compared to detection by a first evaluation value. In this way, a feature value having a higher degree of authentication performance can be registered while acquiring an effect similar to that in the second to third example embodiments.

Fifth Example Embodiment

Next, a fifth example embodiment according to this disclosure will be described by using FIGS. 12 to 17. The fifth example embodiment has a characteristic that a second evaluation value is calculated based on an irradiation pattern of light applied to a target person P.

Figure 12:
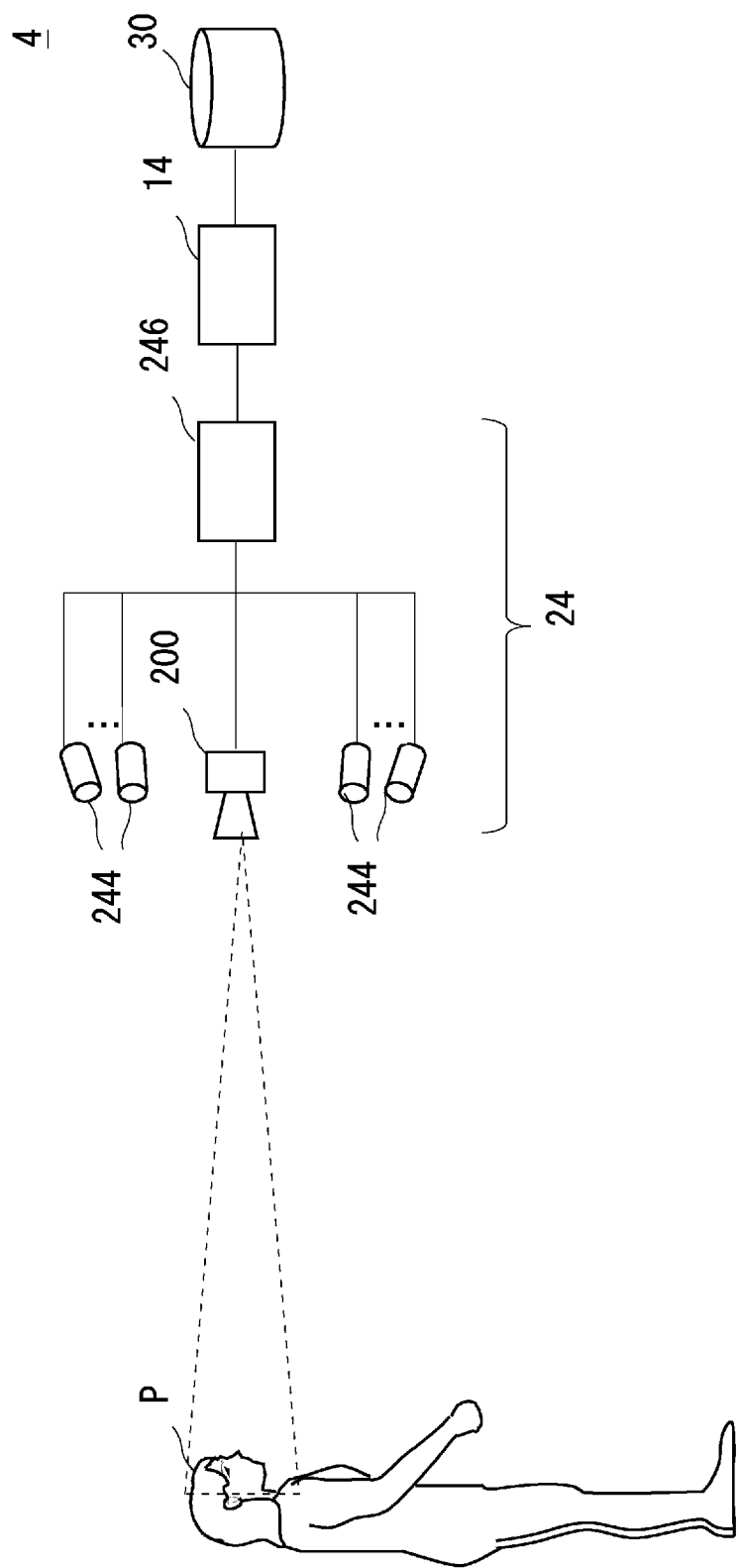
FIG. 12 is a schematic configuration diagram of an imaging system according to a fifth example embodiment.

FIG. 12 is a schematic configuration diagram of an imaging system 4 according to the fifth example embodiment. The imaging system 4 according to the fifth example embodiment basically has a configuration and a function to those of the imaging system 3 according to the fourth example embodiment. However, the imaging system 4 according to the fifth example embodiment includes an imaging device 24 instead of the imaging device 20 and an image processing device 14 instead of the image processing device 13.

The imaging device 24 basically has a configuration and a function similar to those of the imaging device 20, but includes a light source array 244 and a control unit 246 instead of the control unit 206.

The light source array 244 applies light having a predetermined irradiation pattern to the target person P. The light source array 244 may apply near infrared light. The light source array 244 applies light in such a way that a reflection pattern is formed on an eye of the target person P. Note that it is desired that the light source array 244 applies light in such a way that a reflection pattern is formed on a pupil portion except for an iris portion of the eye of the target person P. The light source array 244 may be installed in a position determined based on an assumed standing position of the target person P and a position in which the imaging instrument 200 is installed in order to apply light to the eye, particularly, the pupil of the target person P in such a manner. In the present fifth example embodiment, the light source array 244 includes a plurality of light sources. At this time, an irradiation pattern may be determined by an arrangement of each of the light sources of the light source array 244 and an irradiation direction of each of the light sources. For example, the light source array 244 may include a right light source array and a left light source array being symmetrically disposed in a direction (that is, a left-right direction of the target person P) orthogonal to an optical axis direction of an imaging instrument 200 and a height direction around the optical axis direction. Each of the right light source array and the left light source array may include a plurality of light sources disposed in such a way that light is applied to the target person P at a predetermined interval in the height direction.

The control unit 246 controls an operation of the light source array 244 in addition to the function of the control unit 206. In response to application of light from the light source array 244, the control unit 246 controls an imaging operation of the imaging instrument 200, and acquires a first image I1 from the imaging instrument 200. Then, the control unit 246 supplies the first image I1 to the image processing device 14.

Figure 13:
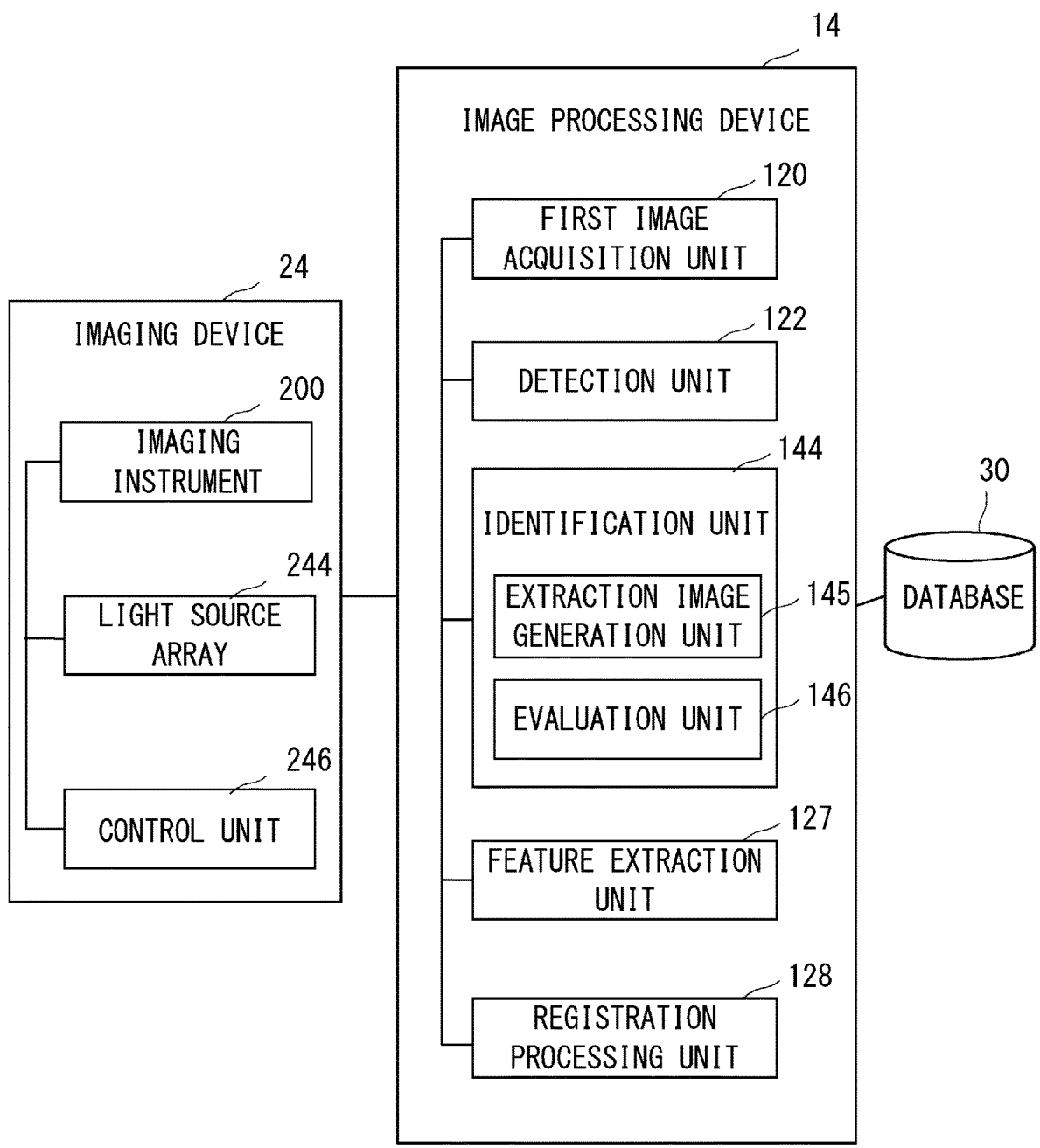
FIG. 13 is a block diagram illustrating a configuration of the imaging system according to the fifth example embodiment.

FIG. 13 is a block diagram illustrating a configuration of the imaging system 4 according to the fifth example embodiment. As described above, the imaging system 4 includes the imaging device 24, the image processing device 14, and a database 30. Here, only a configuration of the image processing device 14 will be described.

The image processing device 14 is a computer basically having a configuration and a function similar to those of the image processing device 13, or the like. However, the image processing device 14 includes an identification unit 144 instead of the identification unit 134.

The identification unit 144 includes an extraction image generation unit 145 and an evaluation unit 146.

The extraction image generation unit 145 basically has a function similar to that of the extraction image generation unit 135, cuts an extraction region according to a candidate region from the first image I1, and generates a second image I2, based on the cut extraction region.

The evaluation unit 146 calculates a second evaluation value, based on a reflection pattern formed in a candidate region in response to application of light of the light source array 244 to the target person P.

Figure 14:
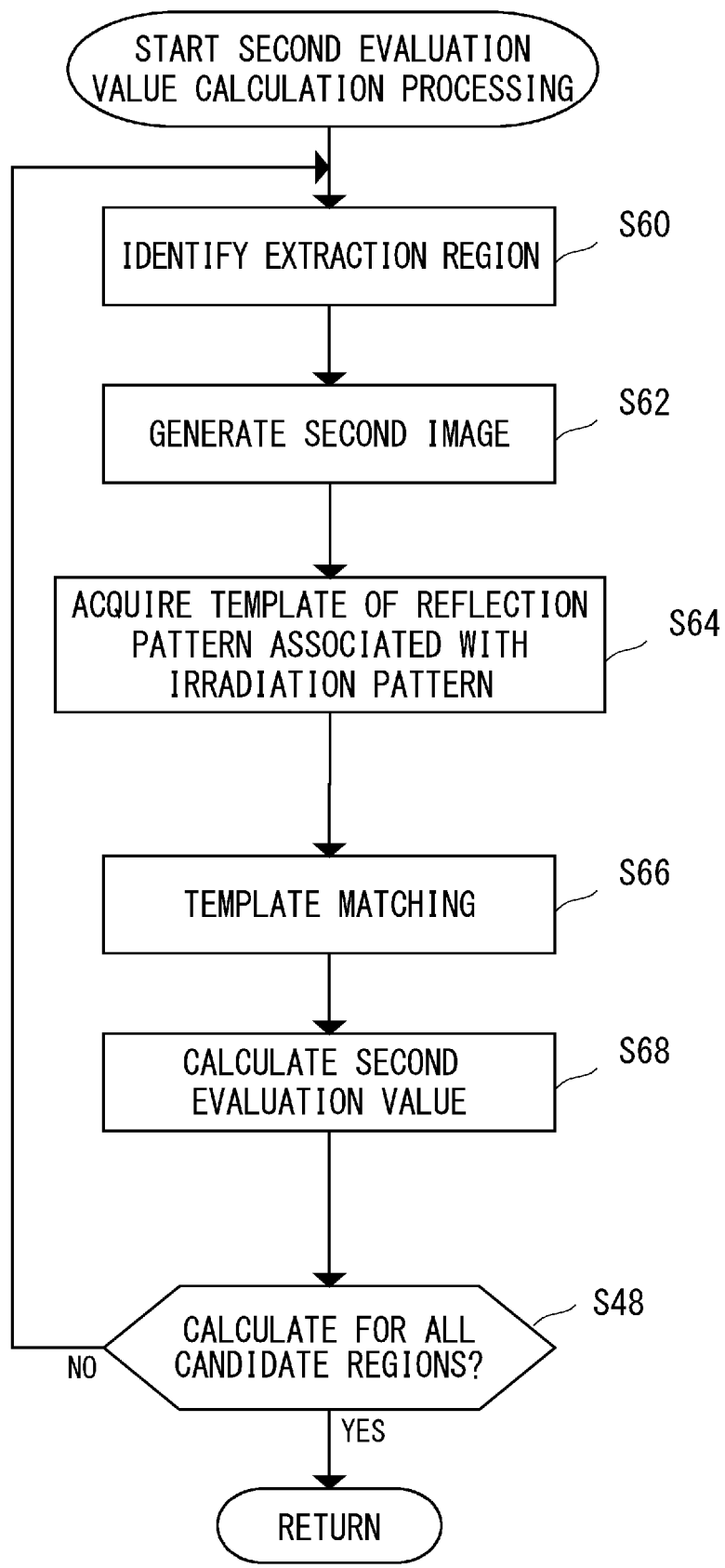
FIG. 14 is a flowchart illustrating second evaluation value calculation processing of an image processing device according to the fifth example embodiment.
Figure 15:
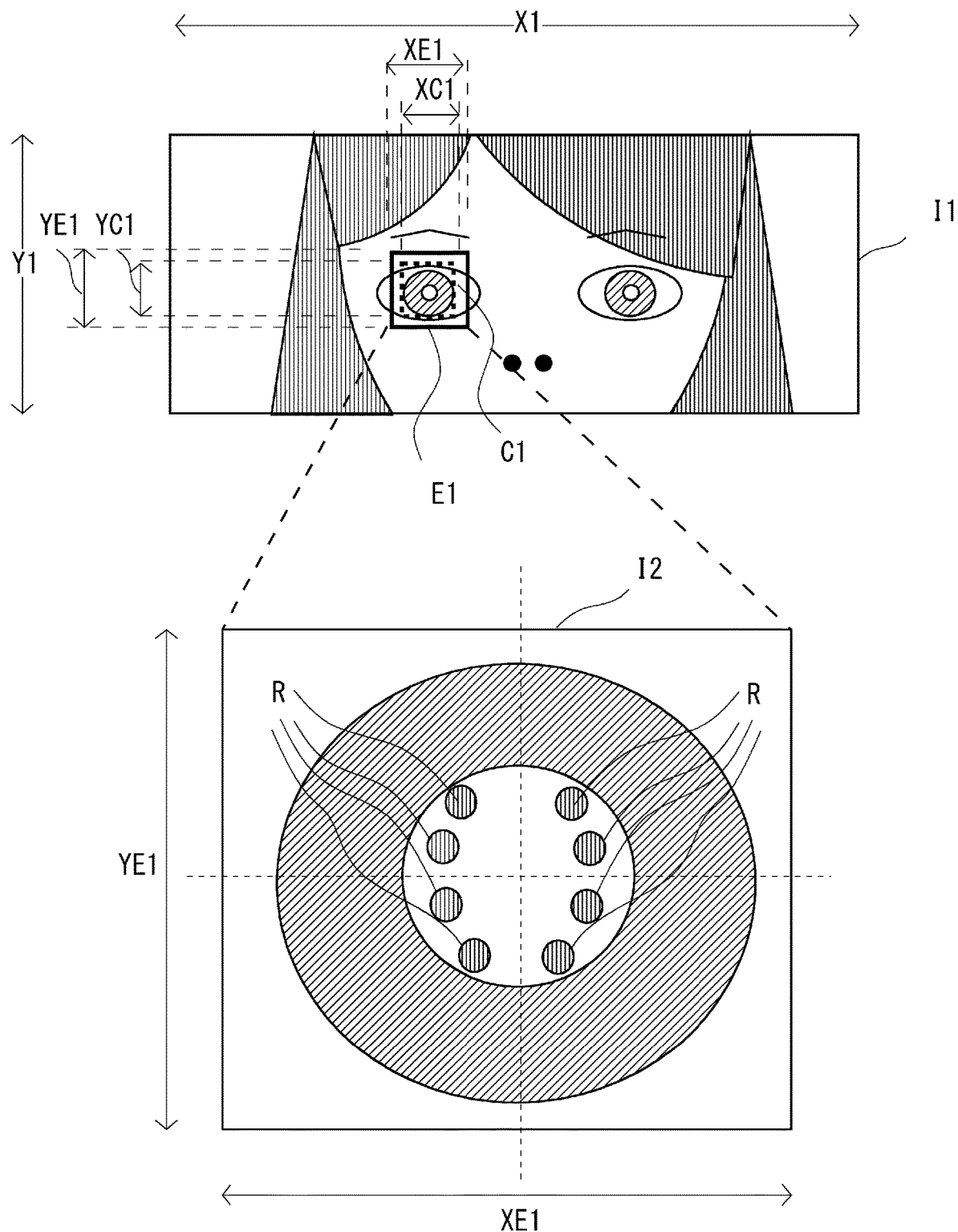
FIG. 15 is a diagram for describing the second evaluation value calculation processing of the image processing device according to the fifth example embodiment.

Next, by using FIG. 14, second evaluation value calculation processing of the identification unit 144 associated with step S34 illustrated in FIG. 6 will be described with reference to FIG. 15. FIG. 14 is a flowchart illustrating the second evaluation value calculation processing of the image processing device 14 according to the fifth example embodiment. Note that a step similar to the step illustrated in FIG. 10 is provided with the same symbol, and description will be appropriately omitted. Further, FIG. 15 is a diagram for describing the second evaluation value calculation processing of the image processing device 14 according to the fifth example embodiment.

Figure 10:
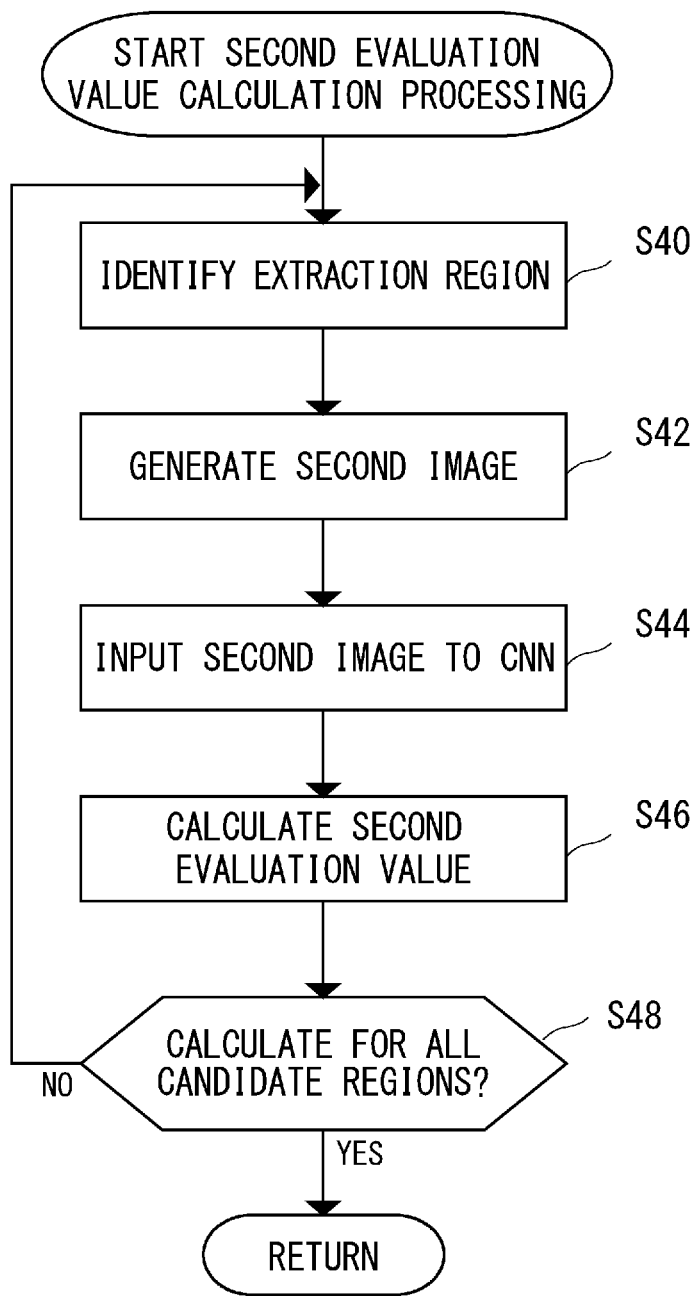
FIG. 10 is a flowchart illustrating second evaluation value calculation processing of an image processing device according to the fourth example embodiment.

In step S60, similarly to step S40 illustrated in FIG. 10, the extraction image generation unit 145 of the identification unit 144 of the image processing device 14 identifies an extraction region from the first image I1, and cuts the extraction region. Here, as illustrated in FIG. 15, the extraction image generation unit 145 identifies, as an extraction region E1 according to a candidate region C1, an image region having a pixel number of XE1×YE1 around a central point of the candidate region C1 having a pixel number of XC1×YC1. XE1 and YE1 may be predetermined according to a pixel number of a template described below.

Next, in step S62, the extraction image generation unit 145 cuts, for each candidate region, the identified extraction region E1 from the first image I1, and generates the second image I2 by using the cut extraction region E1. As illustrated in FIG. 15, the second image I2 may have a pixel number of XE1×YE1 similarly to the extraction region E1. In other words, the extraction image generation unit 145 may replace the cut extraction region E1 with the second image I2 without converting a pixel of the extraction region E1. However, the present example embodiment is not limited to this, and the extraction image generation unit 145 may generate the second image I2 by converting a pixel in such a way that the extraction region E1 has a pixel number of XC2×YC2 similarly to step S42 illustrated in FIG. 10. Note that XC2 and YC2 may be predetermined according to a pixel number of a template described below. Then, the extraction image generation unit 145 supplies the second image I2 to the evaluation unit 146.

Next, in step S64, the evaluation unit 146 acquires a template generated based on a reflection pattern of a cornea being associated with an irradiation pattern of the light source array 244. The template may have a pixel value distribution according to the reflection pattern of the cornea being associated with the irradiation pattern of the light source array 244.

Next, in step S66, the evaluation unit 146 matches the template with the second image I2, and calculates a degree of coincidence between the second image I2 and the template. As illustrated in FIG. 15, when a candidate region is an eye region, a reflection pattern R similar to the reflection pattern of the cornea is projected in a region associated with a pupil of the second image I2. In FIG. 15, an irradiation pattern has a symmetrical shape, and the reflection pattern R has a substantially symmetrical shape according to the irradiation pattern by cornea reflection. As one example, the reflection pattern R includes a reflection pattern on a left side and a reflection pattern on a right side, and both of the reflection patterns include spots arranged at a substantially regular interval therebetween in the height direction. Note that, when a candidate region is other than an eye region, irradiated light is scattered, and thus such a reflection pattern R cannot be acquired. Therefore, when a candidate region is an eye region, a degree of coincidence with the template is relatively increased.

Next, in step S68, the evaluation unit 146 sets, as a second evaluation value, the degree of coincidence associated with the candidate region. In this way, the evaluation unit 146 calculates the second evaluation value associated with the candidate region.

Note that the processing illustrated in step S60 may be omitted. In this case, in step S62, the "extraction region" is replaced with the "candidate region", "XE1" is replaced with "XC1", and "YE1" is replaced with "YC1".

Note that, in the fifth example embodiment, the evaluation unit 146 calculates a second evaluation value for a candidate region by using template matching. However, the present example embodiment is not limited to this, and the evaluation unit 146 may calculate a second evaluation value by using a learned reflection pattern evaluation model with the second image I2 as input data. The learned reflection pattern evaluation model includes a learned CNN that outputs a second evaluation value from the second image I2 in which the reflection pattern R is projected.

Figure 16:
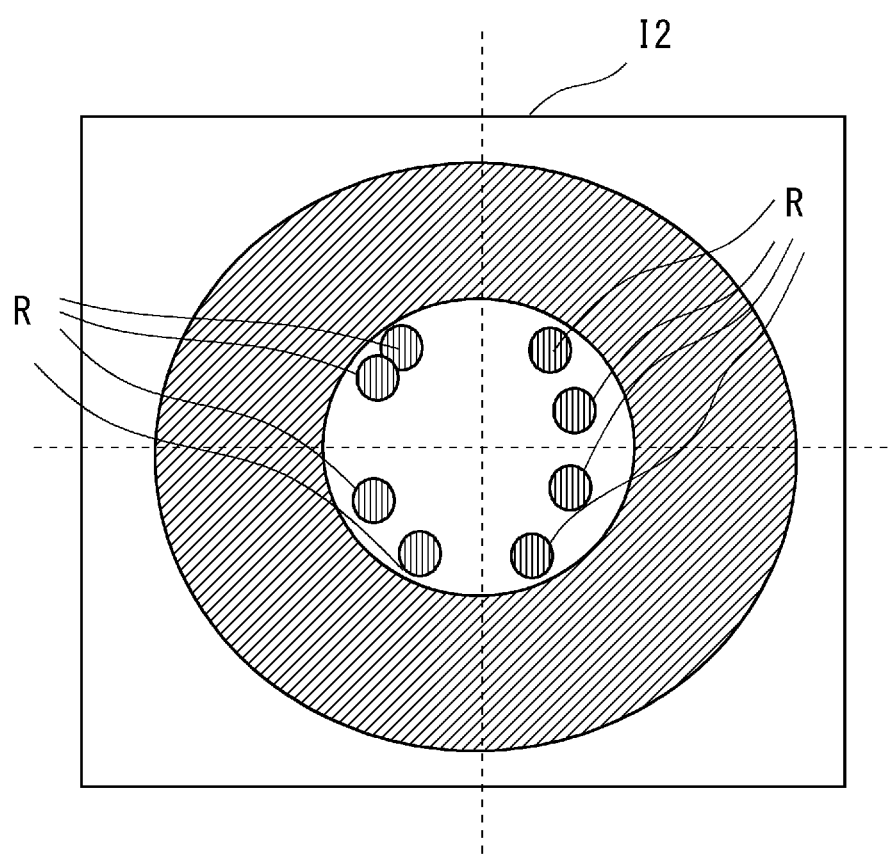
FIG. 16 is a diagram for describing a reflection pattern with respect to an irradiation pattern of light of a light source array according to the fifth example embodiment.
Figure 17:
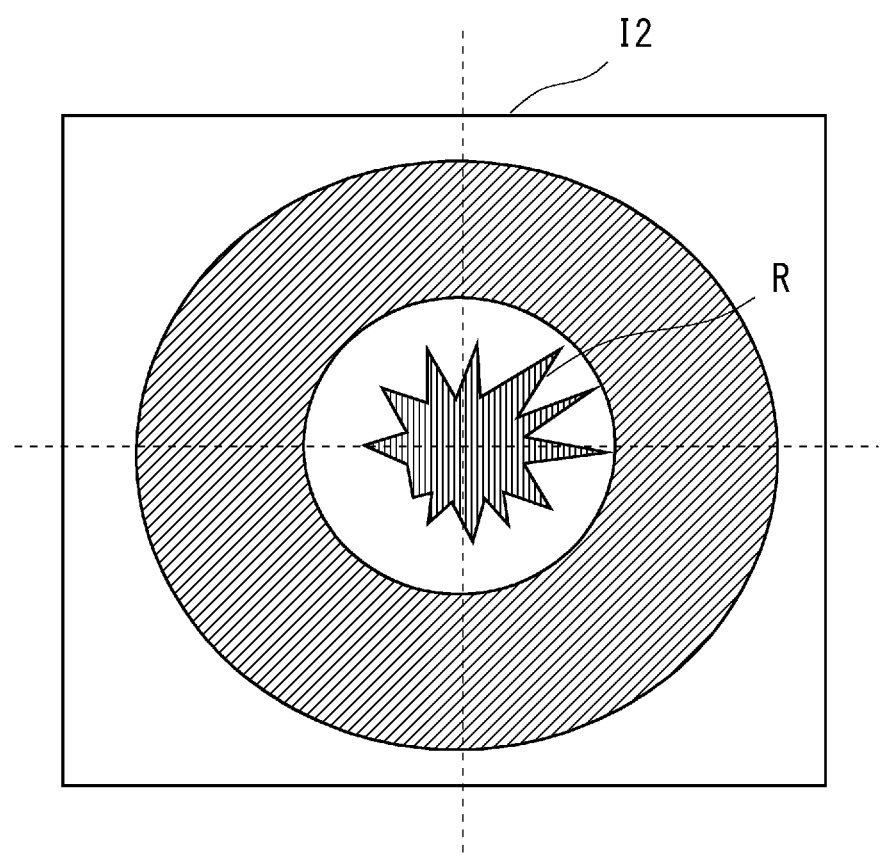
FIG. 17 is a diagram for describing a reflection pattern with respect to an irradiation pattern of light of the light source array according to the fifth example embodiment.

Note that, in order to further facilitate detection of the reflection pattern R, an irradiation pattern of light applied from the light source array 244 preferably has an asymmetrical shape. FIGS. 16 to 17 are diagrams for describing the reflection pattern R with respect to an irradiation pattern of light of the light source array 244 according to the fifth example embodiment. FIGS. 16 and 17 illustrate the second image I2 in which the reflection pattern R is projected and that is associated with the candidate region C1.

As illustrated in FIGS. 16 and 17, when a candidate region is an eye region, the reflection pattern R has an asymmetrical shape according to an asymmetrical shape of an irradiation pattern by cornea reflection. Note that, when a candidate region is other than an eye region, irradiated light is scattered, and thus such a reflection pattern R cannot be acquired.

FIG. 16 illustrates the second image I2 when, as one example, a reflection pattern on a left side includes spots arranged at an irregular interval therebetween in the height direction. Therefore, the reflection pattern on the left side and a reflection pattern on a right side are asymmetrical with respect to a central axis of the second image I2 indicated by a broken line. At this time, the light source array 244 may include a right light source array and a left light source array, and the left light source array may include a plurality of light sources disposed in such a way that light is applied to the target person P at an irregular interval in the height direction.

FIG. 17 illustrates the second image I2 when, as one example, the reflection pattern R includes spots in which a spot shape is an asymmetrical shape. An irradiation pattern in this case may be formed by combining light having different spot diameters of a plurality of light sources.

Further, an irradiation pattern in this case may be formed by forming a spot shape to be asymmetrical by a filter or the like for light of a single light source. At this time, the light source array 244 may be a single light source instead of including a plurality of light sources.

In this way, according to the fifth example embodiment, the light source array 244 of the imaging system 4 applies light and forms a reflection pattern associated with a predetermined irradiation pattern on a body portion of the target person P associated with a candidate region. Then, the image processing device 14 calculates a second evaluation value, based on the reflection pattern in the candidate region. Therefore, whether the candidate region is an eye region can be more precisely evaluated. In this way, a feature value having a higher degree of authentication performance can be registered while acquiring an effect similar to that in the second to third example embodiments.

Sixth Example Embodiment

Next, a sixth example embodiment according to this disclosure will be described by using FIGS. 18 to 20. The sixth example embodiment has a characteristic that an imaging instrument and a light source array are controlled based on a whole captured image of a target person P.

Figure 18:
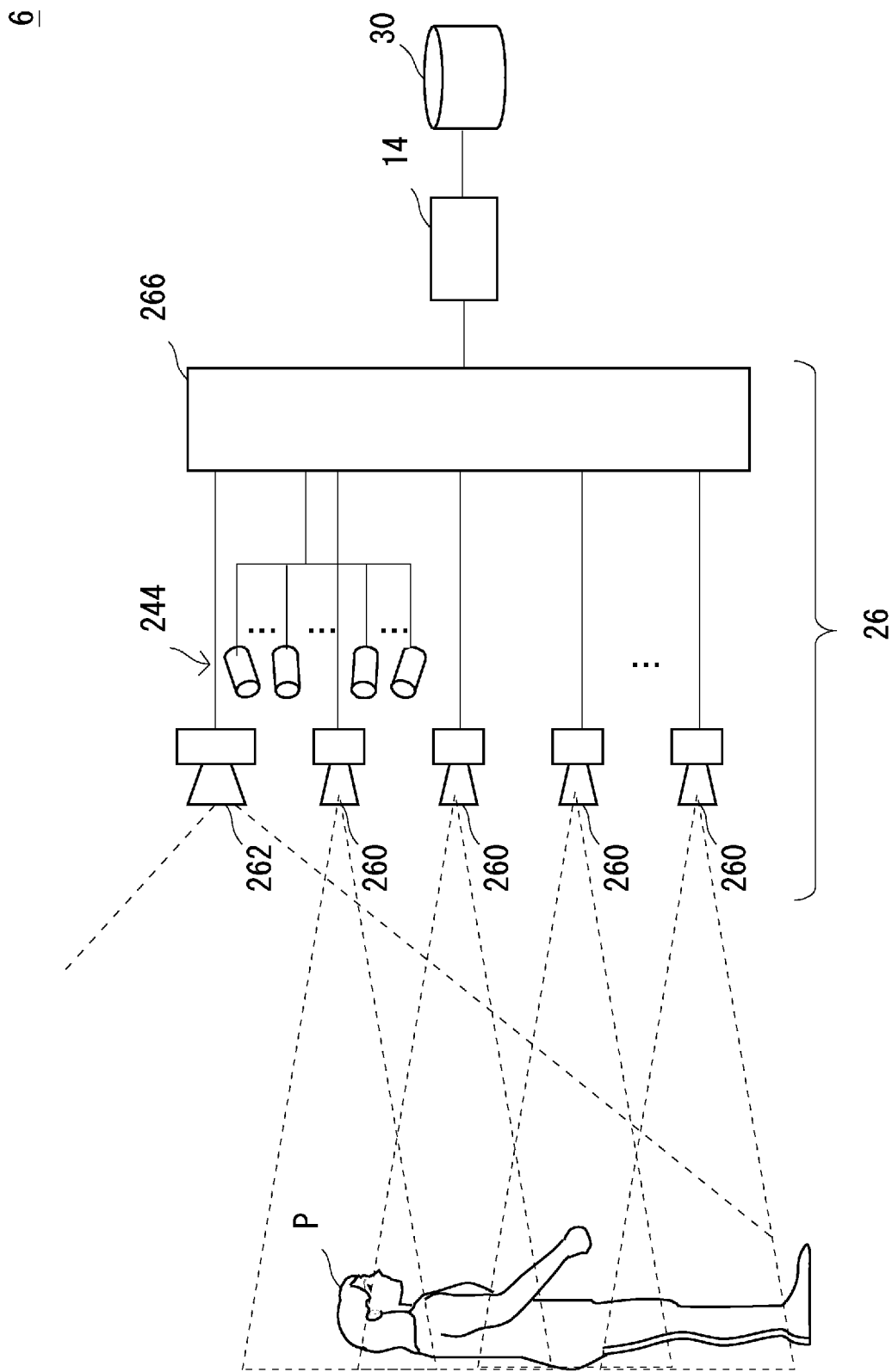
FIG. 18 is a schematic configuration diagram of an imaging system according to a sixth example embodiment.
Figure 19:
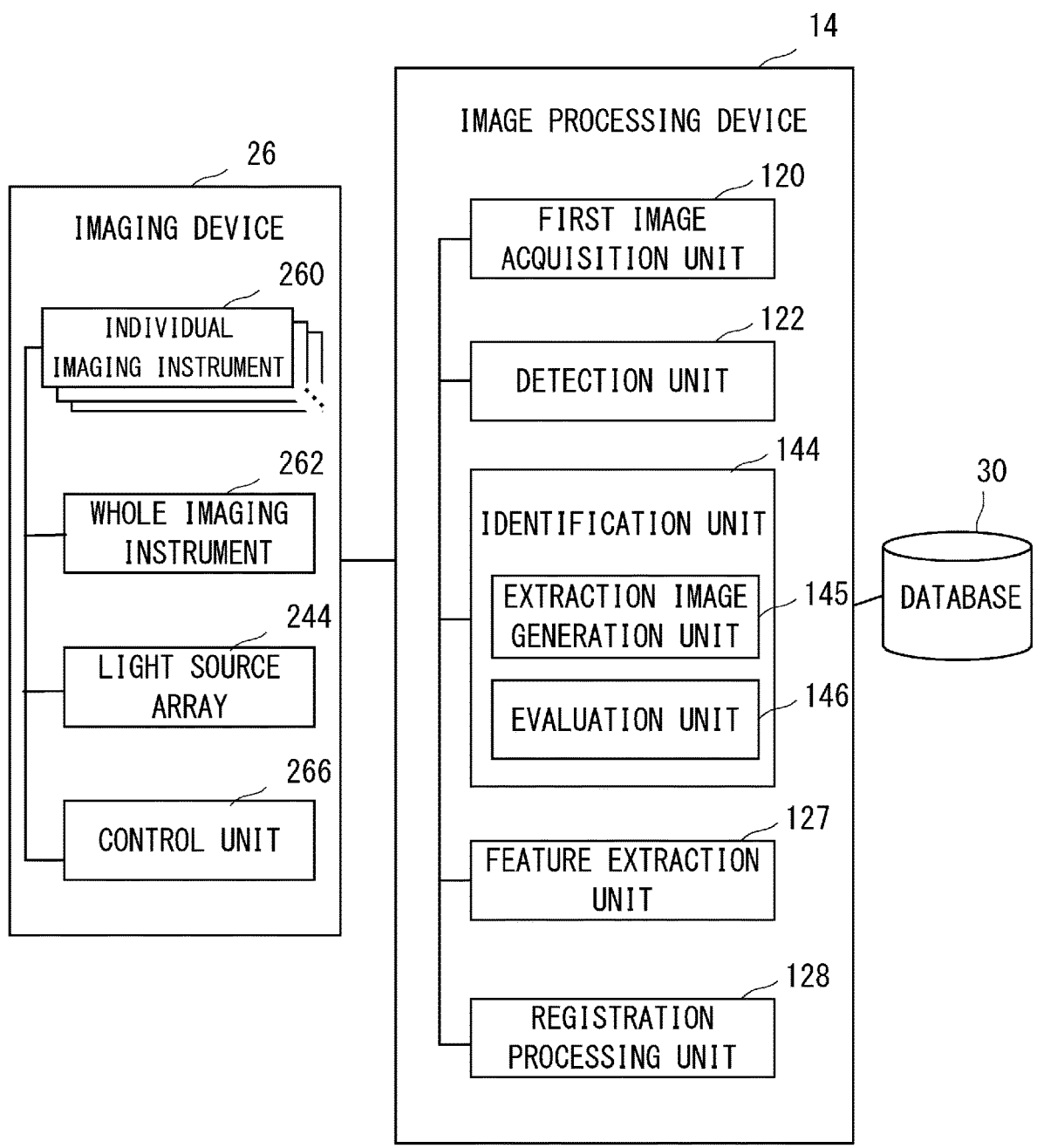
FIG. 19 is a block diagram illustrating a configuration of the imaging system according to the sixth example embodiment.

FIG. 18 is a schematic configuration diagram of an imaging system 6 according to the sixth example embodiment. Further, FIG. 19 is a block diagram illustrating a configuration of the imaging system 6 according to the sixth example embodiment. The imaging system 6 according to the sixth example embodiment basically has a configuration and a function to those of the imaging system 4 according to the fifth example embodiment. However, the imaging system 6 according to the sixth example embodiment includes an imaging device 26 instead of the imaging device 24.

The imaging device 26 basically has a configuration and a function similar to those of the imaging device 24, but includes a plurality of individual imaging instruments 260, a whole imaging instrument 262, and a control unit 266 instead of the imaging instrument 200 and the control unit 246.

The plurality of individual imaging instruments 260 are each a camera having a function similar to that of the imaging instrument 200, and are disposed in positions different from each other in the same visual field range.

The whole imaging instrument 262 is a camera for capturing a whole of the target person P. The whole imaging instrument 262 captures the target person P in a visual field range wider than the visual field range of the individual imaging instrument 260 in such a way as to be able to cover a range of a great height to a small height of the target person P. Note that, it is assumed that the whole imaging instrument 262 has a resolution to a degree that a position of a face, particularly, around an eye of the target person P can be estimated. Then, the whole imaging instrument 262 generates a whole captured image of the target person P.

The control unit 266 basically has a function similar to that of the control unit 246, but controls an operation of a light source array 244 in such a way that the light source array 244 suitably applies light to an eye, based on an image of the whole imaging instrument 262. Further, the control unit 266 selects the individual imaging instrument 260 that can suitably capture an eye, based on a whole captured image supplied from the whole imaging instrument 262, and controls an imaging operation of the selected individual imaging instrument 260.

Figure 20:
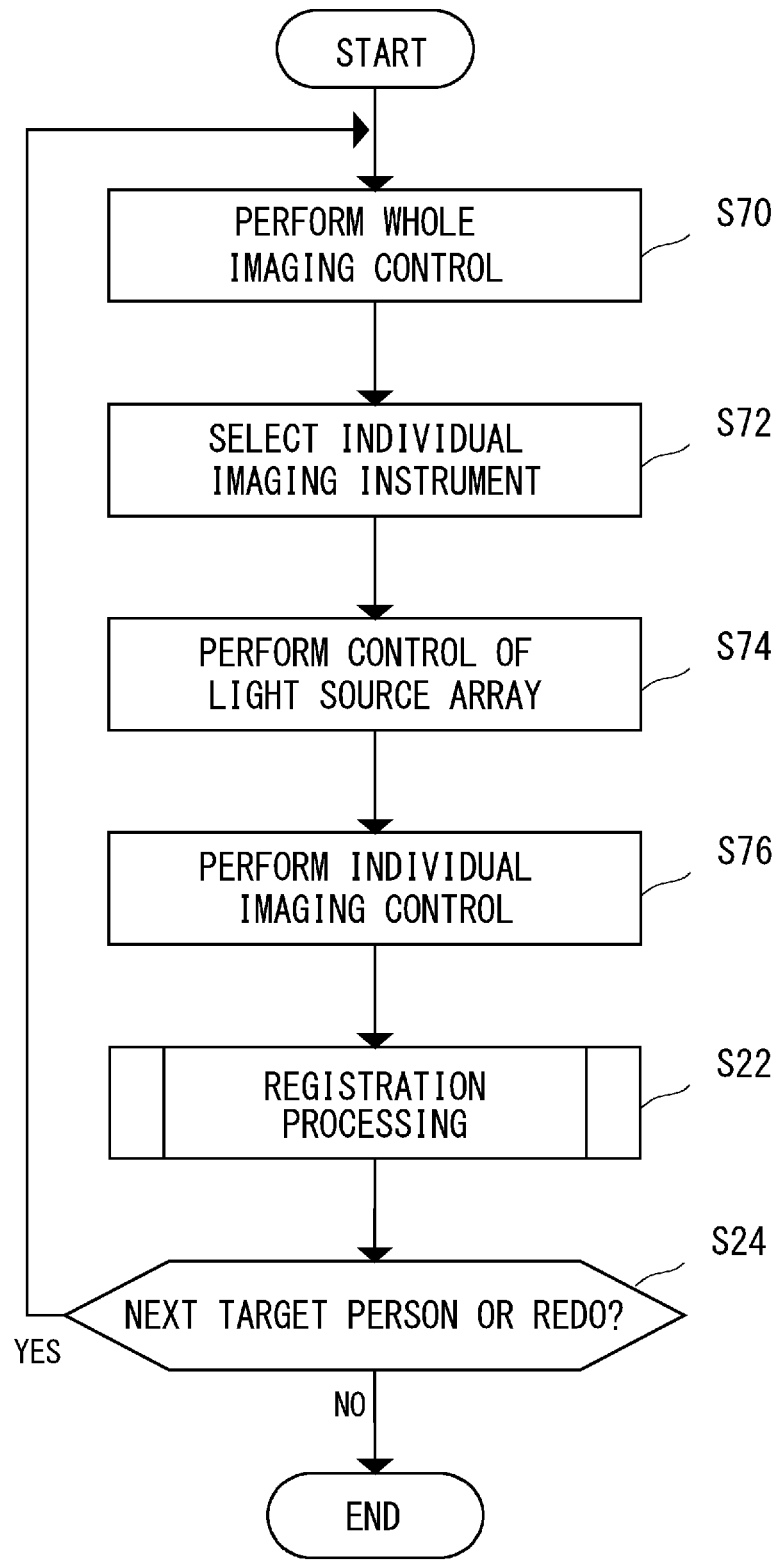
FIG. 20 is a flowchart illustrating processing of the imaging system according to the sixth example embodiment.

FIG. 20 is a flowchart illustrating processing of the imaging system 6 according to the sixth example embodiment. A step similar to the step illustrated in FIG. 5 is provided with the same symbol, and description will be omitted.

First, in step S70, the control unit 266 of the imaging device 26 of the imaging system 6 controls the whole imaging instrument 262, and causes the whole imaging instrument 262 to perform an operation of capturing a whole of the target person P. The whole imaging instrument 262 generates a hole captured image, and supplies the whole captured image to the control unit 266.

Next, in step S72, the control unit 266 estimates a position around an eye of the target person P in the whole captured image being supplied from the whole imaging instrument 262. Then, the control unit 266 selects the individual imaging instrument 260 associated with the position around the eye of the target person P in the whole captured image by using a camera parameter and an arrangement relationship of the whole imaging instrument 262 and each of the individual imaging instruments 260.

In step S74, the control unit 266 adjusts at least one of an arrangement and an orientation of an optical axis of the light source array 244 according to the derived position around the eye and an arrangement relationship between the target person P and the whole imaging instrument 262. Then, the control unit 266 causes the light source array 244 to apply light to the target person P.

Next, in step S76, the control unit 266 controls the selected individual imaging instrument 260, and causes the individual imaging instrument 260 to perform an operation of capturing at least a part of a body including the eye of the target person P. The individual imaging instrument 260 generates a first image I1 being a captured image, and supplies the first image I1 to the control unit 266. Then, the control unit 266 transmits the first image I1 to an image processing device 14.

In this way, according to the sixth example embodiment, the imaging system 6 estimates a position around an eye from a whole captured image, adjusts a position of the light source array 244, based on the estimated position, and selects the individual imaging instrument 260 that suitably captures the eye. In this way, a feature value having a higher degree of authentication performance can be registered while acquiring an effect similar to that in the second to fifth example embodiments.

A computer in the first to sixth example embodiments described above is formed of a computer system including a personal computer, a word processor, and the like. However, this disclosure is not limited to this, and the computer can also be formed of a computer system connected onto a server of a local area network (LAN), a host of computer (personal computer) communication, or the Internet, and the like. Further, the computer can also be formed of the entire network by distributing a function to each apparatus on the network.

Note that, in the first to sixth example embodiments, this disclosure has been described above as a configuration of hardware, but this disclosure is not limited to this. This disclosure can also achieve various types of processing such as the imaging control processing, the registration processing, and the light source control processing described above by causing a processor 1010 described below to execute a computer program.

Figure 21:
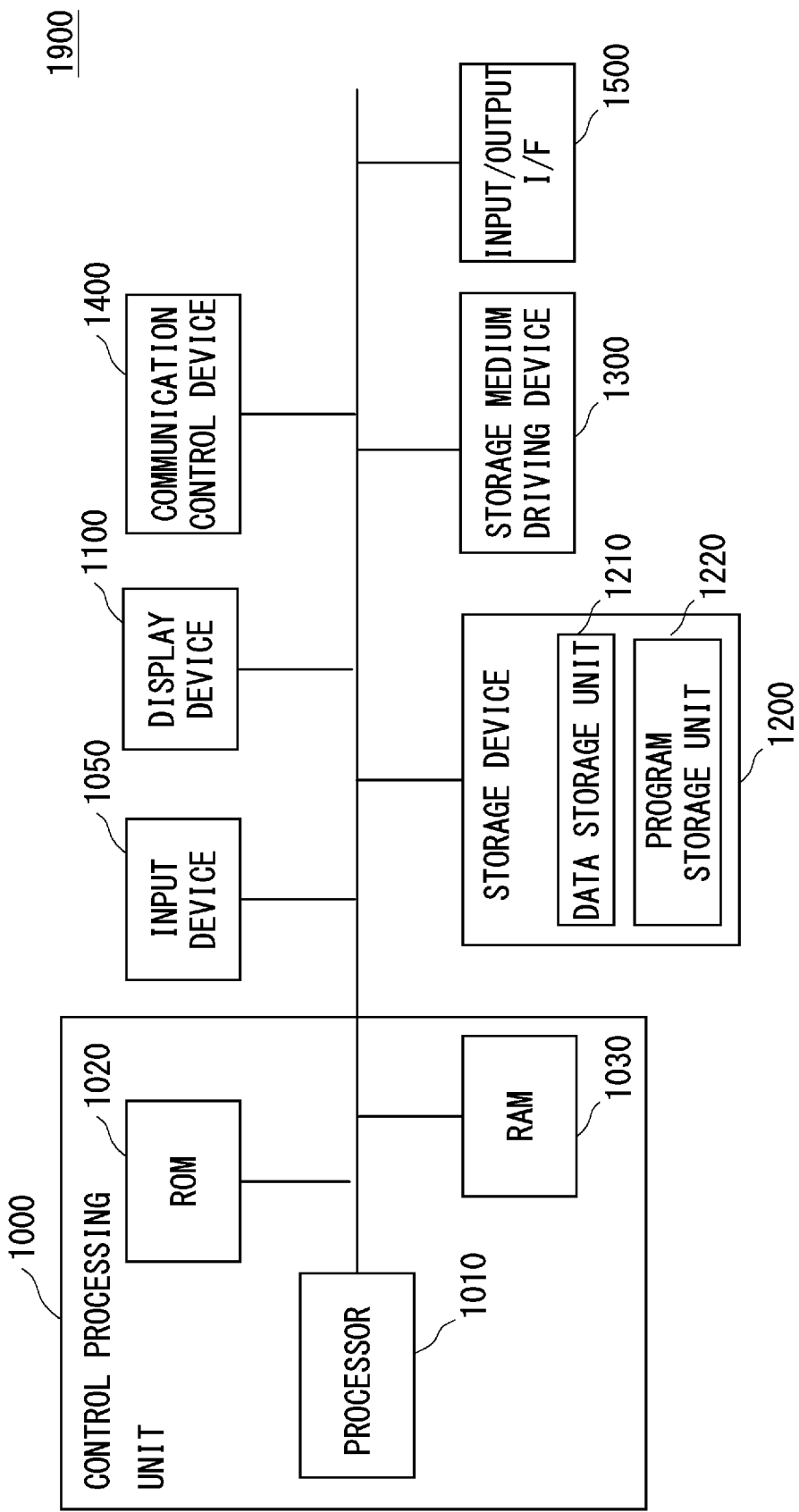
FIG. 21 is a configuration diagram of a computer according to the first to sixth example embodiments.

FIG. 21 is one example of a configuration diagram of a computer 1900 according to the first to sixth example embodiments. As illustrated in FIG. 21, the computer 1900 includes a control processing unit 1000 for controlling the entire system. An input device 1050, a storage device 1200, a storage medium driving device 1300, a communication control device 1400, and an input/output I/F 1500 are connected to the control processing unit 1000 via a bus line such as a data bus.

The control processing unit 1000 includes the processor 1010, a ROM 1020, and a RAM 1030.

The processor 1010 performs various types of information processing and control according to a program stored in various storage units such as the ROM 1020 and the storage device 1200.

The ROM 1020 is a read-only memory that previously stores various programs and data for the processor 1010 to perform various types of control and computations.

The RAM 1030 is a random-access memory used as a work memory by the processor 1010. Various areas for performing various types of processing according to the present first to sixth example embodiments can be secured in the RAM 1030.

The input device 1050 is an input device that receives an input from a user, such as a keyboard, a mouse, and a touch panel. For example, various keys such as numeric keys, a functional key for performing various functions, and a cursor key are disposed in a keyboard. A mouse is a pointing device, and is an input device that designates an associated function by clicking a key, an icon, and the like displayed on the display device 1100. A touch panel is an input apparatus disposed on a surface of the display device 1100, and specifies a touch position of a user being associated with various operation keys displayed on the screen of the display device 1100, and receives an input of the operation key displayed in association with the touch position.

For example, a CRT, a liquid crystal display, or the like is used for the display device 1100. The display device displays an input result by a keyboard or a mouse, and displays searched image information in the end. Further, the display device 1100 displays an image of an operation key for performing various necessary operations from a touch panel according to various functions of the computer 1900.

The storage device 1200 is formed of a storage medium that can perform reading and writing, and a driving device for reading and writing various types of information, such as a program and data, from and to the storage medium.

As the storage medium used for the storage device 1200, a hard disk or the like is mainly used, but a non-transitory computer-readable medium used in the storage medium driving device 1300 described below may be used.

The storage device 1200 includes a data storage unit 1210, a program storage unit 1220, another storage unit (for example, a storage unit for backing up a program, data, and the like being stored in the storage device 1200) that is not illustrated, and the like. The program storage unit 1220 stores a program for achieving various types of processing in the present first to sixth example embodiments. The data store unit 1210 stores various types of data of various databases according to the present first to sixth example embodiments.

The storage medium driving device 1300 is a driving device for the processor 1010 to read a computer program, data including a document, and the like from a storage medium (external storage medium) outside.

Herein, the external storage medium refers to a non-transitory computer-readable medium that stores a computer program, data, and the like. The non-transitory computer-readable medium includes a tangible storage medium of various types. Examples of the non-transitory computer-readable medium include a magnetic recording medium (for example, a flexible disk, a magnetic tape, and a hard disk drive), a magneto-optical recording medium (for example, a magneto-optical disk), a CD-read only memory (CD-ROM), a CD-R, a CD-R/W, and a semiconductor memory (for example, a mask ROM, a programmable ROM (PROM), an erasable PROM (EPROM), a flash ROM, and a random access memory (RAM)). Further, various programs may be supplied to a computer by a transitory computer-readable medium of various types. Examples of the transitory computer-readable medium include an electric signal, an optical signal, and an electromagnetic wave. The transitory computer-readable medium can supply various programs to the computer 1900 via a wired communication path such as an electric wire and an optical fiber or a wireless communication path and the storage medium driving device 1300.

In other words, in the computer 1900, various programs from the external storage medium being set for the storage medium driving device 1300 are read by the processor 1010 of the control processing unit 1000, and are stored in each of the units of the storage device 1200.

Then, when the computer 1900 performs various types of processing, a corresponding program is read from the storage device 1200 into the RAM 1030 and is executed. However, the computer 1900 can also read and execute a program directly into the RAM 1030 from the external storage medium, instead of the storage device 1200, by the storage medium driving device 1300. Further, depending on a computer, various programs and the like may be stored in advance in the ROM 1020 and may be executed by the processor 1010. Furthermore, the computer 1900 may download various programs and data from another storage medium via the communication control device 1400 and may execute the various programs and the data.

The communication control device 1400 is a control device for network-connecting the computer 1900 and various external electronic apparatuses such as another personal computer and another word processor. The communication control device 1400 can access the computer 1900 from various external electronic apparatuses.

The input/output I/F 1500 is an interface for connecting various input/output devices via a parallel port, a serial port, a keyboard port, a mouse port, or the like.

Note that, as the processor 1010, a central processing unit (CPU), a graphics processing unit (GPU), a field-programmable gate array (FPGA), a digital signal processor (DSP), an application specific integrated circuit (ASIC), and the like may be used. Further, a plurality thereof may be used in parallel.

An execution order of each processing in the system and the method indicated in the claims, the specification, and the drawings is not particularly stated such as "before" and "prior to", and any order can be achieved as long as an output of previous processing is not used for subsequent processing. Even when "first", "next", or the like is used for the sake of convenience to describe an operation flow in the claims, the specification, and the drawings, it does not mean that execution in this order is essential.

Although this disclosure has been described with reference to the example embodiments, this disclosure is not limited to the above-described example embodiments. Various modifications that can be understood by those skilled in the art can be made to the configuration and the details of this disclosure within the scope of the invention. A part or the whole of the above-described example embodiments may also be described in supplementary notes below, which is not limited thereto.

(Supplementary Note 1)

An image processing system comprising:

a detection unit configured to detect, from a first image in which a target person is captured, a candidate region being an image region estimated to represent an eye of the target person, based on a first evaluation value;

an identification unit configured to identify, from the detected candidate region, an eye region being an image region that represents the eye, based on a second evaluation value; and a feature extraction unit configured to extract a feature value of the identified eye region, wherein the first evaluation value indicates a likelihood of the eye, and is calculated for an image region being set based on the first image, and the second evaluation value indicates a likelihood of the eye, and is calculated for an image region being set based on the detected candidate region.

(Supplementary Note 2)

The image processing system according to Supplementary Note 1, wherein the identification unit includes an evaluation unit configured to calculate the second evaluation value, based on a reflection pattern formed in the candidate region in response to application of light having a predetermined irradiation pattern to the target person.

(Supplementary Note 3)

The image processing system according to Supplementary Note 2, wherein the irradiation pattern has an asymmetrical shape.

(Supplementary Note 4)

The image processing system according to any one of Supplementary Notes 1 to 3, wherein the identification unit includes an extraction image generation unit configured to cut an extraction region according to the candidate region from the first image, and generate a second image, based on the cut extraction region, and an evaluation unit configured to calculate the second evaluation value by using a learned eye evaluation model with the second image as input data.

(Supplementary Note 5)

An imaging system comprising:

an imaging device configured to capture an image of a target person, and generate a first image; and an image processing device including: a detection unit configured to detect, from the first image, a candidate region being an image region estimated to represent an eye of the target person, based on a first evaluation value; an identification unit configured to identify, from the detected candidate region, an eye region being an image region that represents the eye, based on a second evaluation value; and a feature extraction unit configured to extract a feature value of the identified eye region, wherein the first evaluation value indicates a likelihood of the eye, and is calculated for an image region being set based on the first image, and the second evaluation value indicates a likelihood of the eye, and is calculated for an image region being set based on the detected candidate region.

(Supplementary Note 6)

The imaging system according to Supplementary Note 5, further comprising a light source array configured to apply light having a predetermined irradiation pattern to the target person.

(Supplementary Note 7)

The imaging system according to Supplementary Note 6, wherein the irradiation pattern has an asymmetrical shape.

(Supplementary Note 8)

The imaging system according to any one of Supplementary Notes 5 to 7, wherein
the imaging device further includes
a plurality of individual imaging instruments disposed in positions different from one another in the same visual field range, and
a whole imaging instrument configured to perform imaging in a visual field range wider than a visual field range of the individual imaging instrument.

(Supplementary Note 9)

An image processing method comprising:
a detection step of detecting, from a first image in which a target person is captured, a candidate region being an image region estimated to represent an eye of the target person, based on a first evaluation value;
an identification step of identifying, from the detected candidate region, an eye region being an image region that represents the eye, based on a second evaluation value; and
a feature extraction step of extracting a feature value of the identified eye region, wherein
the first evaluation value indicates a likelihood of the eye, and is calculated for an image region being set based on the first image, and
the second evaluation value indicates a likelihood of the eye, and is calculated for an image region being set based on the detected candidate region.

(Supplementary Note 10)

A non-transitory computer-readable medium configured to store an image processing program causing a compute to execute an image processing method including:
a detection step of detecting, from a first image in which a target person is captured, a candidate region being an image region estimated to represent an eye of the target person, based on a first evaluation value;
an identification step of identifying, from the detected candidate region, an eye region being an image region that represents the eye, based on a second evaluation value; and
a feature extraction step of extracting a feature value of the identified eye region, wherein
the first evaluation value indicates a likelihood of the eye, and is calculated for an image region being set based on the first image, and
the second evaluation value indicates a likelihood of the eye, and is calculated for an image region being set based on the detected candidate region.

REFERENCE SIGNS LIST 2, 3, 4, 6 IMAGING SYSTEM
10 IMAGE PROCESSING SYSTEM
12, 13, 14 IMAGE PROCESSING DEVICE
20, 24, 26 IMAGING DEVICE
30 DATABASE
102, 122 DETECTION UNIT
120 FIRST IMAGE ACQUISITION UNIT
104, 124, 134, 144 IDENTIFICATION UNIT
107, 127 FEATURE EXTRACTION UNIT
128 REGISTRATION PROCESSING UNIT
135, 145 EXTRACTION IMAGE GENERATION UNIT
136, 146 EVALUATION UNIT
200 IMAGING INSTRUMENT
206, 246, 266 CONTROL UNIT
244 LIGHT SOURCE ARRAY
260 INDIVIDUAL IMAGING INSTRUMENT
262 WHOLE IMAGING INSTRUMENT
P TARGET PERSON
I1 FIRST IMAGE
I2 SECOND IMAGE
C1 TO C5 CANDIDATE REGION
E1 EXTRACTION REGION
S SECOND EVALUATION VALUE
1000 CONTROL PROCESSING UNIT
1010 PROCESSOR
1020 ROM
1030 RAM
1050 INPUT DEVICE
1100 DISPLAY DEVICE
1200 STORAGE DEVICE
1210 DATA STORAGE UNIT
1220 PROGRAM STORAGE UNIT
1300 STORAGE MEDIUM DRIVING DEVICE
1400 COMMUNICATION CONTROL DEVICE
1500 INPUT/OUTPUT I/F
1900 COMPUTER

What is claimed is:

1. An image processing system comprising:
at least one memory storing instructions; and
at least one processor configured to execute the instructions to:
set a plurality of first evaluation target regions within a first image in which a target person is captured;
calculate a first evaluation value for each first evaluation target region, indicating a likelihood that the each first evaluation target region includes an iris of an eye of the target person;
select, as a candidate region and from among the plurality of first evaluation target regions, a first evaluation region for which the first evaluation value is greater than a first threshold value corresponding to the selected first evaluation region including the iris of the eye of the target person;
calculate a second evaluation value for the candidate region, indicating a likelihood that the iris of the eye of the target person is in a center part of the candidate region, based on a reflection pattern formed in the candidate region in response to application of light having a predetermined irradiation pattern to the target person;
identify, as an eye region represents the eye of the target person, in response to the second evaluation value being greater than a second threshold value corresponding to the identified eye region being sufficient for biometric iris authentication of the target person and such that biometric iris authentication accuracy is improved;
extract a feature value of the identified eye region; and
perform biometric iris authentication of the target person using the extracted feature value.

2. The image processing system according to claim 1, wherein the reflection pattern includes spots arranged at a regular interval therebetween in the height direction.

3. The image processing system according to claim 1, wherein the irradiation pattern has an asymmetrical shape.

4. The image processing system according to claim 3, wherein the reflection pattern includes spots arranged at an irregular interval therebetween in the height direction.

5. The image processing system according to claim 3, wherein the reflection pattern includes spots in which a spot shape is an asymmetrical shape.

6. The image processing system according to claim 3, wherein the irradiation pattern is formed by combining light having different spot diameters of a plurality of light sources.

7. The image processing system according to claim 3, wherein the illumination pattern is formed by forming a spot shape to be asymmetrical by a filter for light of a single light source.

8. The image processing system according to claim 1, wherein
the at least one processor is configured to:
cut an extraction region according to the candidate region from the first image;
generate a second image, based on the cut extraction region; and
calculate the second evaluation value by using a learned eye evaluation model with the second image as input data.

9. An imaging system comprising:
an imaging device configured to capture an image of a target person and generate a first image; and
an image processing device including:
at least one memory storing instructions; and
at least one processor configured to execute the instructions to:
set a plurality of first evaluation target regions within the first image in which the target person is captured;
calculate a first evaluation value for each first evaluation target region, indicating a likelihood that the each first evaluation target region includes an iris of an eye of the target person;
select, as a candidate region and from among the plurality of first evaluation target regions, a first evaluation region for which the first evaluation value is greater than a first threshold value corresponding to the selected first evaluation region including the iris of the eye of the target person;
calculate a second evaluation value for the candidate region, indicating a likelihood that the iris of the eye of the target person is in a center part of the candidate region, based on a reflection pattern formed in the candidate region in response to application of light having a predetermined irradiation pattern to the target person:
identify, as an eye region represents the eye of the target person, in response to the second evaluation value being greater than a second threshold value corresponding to the identified eye region being sufficient for biometric iris authentication of the target person and such that biometric iris authentication accuracy is improved;
extract a feature value of the identified eye region; and
perform biometric iris authentication of the target person using the extracted feature value.

10. The imaging system according to claim 9, further comprising a light source array configured to apply light having a predetermined irradiation pattern to the target person.

11. The imaging system according to claim 10, wherein the light source array is installed in a position determined based on an assumed standing position of the target person and a position in which the imaging device is installed.

12. The imaging system according to claim 10, wherein the light source array includes a right light source array and a left light source array symmetrically disposed in a direction orthogonal to the optical axis direction and height direction of the imaging device.

13. The imaging system according to claim 12, wherein each of the right light source array and the left light source array include a plurality of light sources disposed in such a way that light is applied to the target person at a predetermined interval in the height direction.

14. The imaging system according to claim 12, wherein one of the right light source array and the left light source array includes a plurality of light sources disposed in such a way that light is applied to the target person at an irregular interval in the height direction.

15. The imaging system according to claim 10, wherein the irradiation pattern has an asymmetrical shape.

16. The image system according to claim 15, wherein the reflection pattern includes spots in which a spot shape is an asymmetrical shape.

17. The image system according to claim 15, wherein the irradiation pattern is formed by combining light having different spot diameters of a plurality of light sources.

18. The image system according to claim 15, wherein the illumination pattern is formed by forming a spot shape to be asymmetrical by a filter for light of a single light source.

19. The imaging system according to claim 9, wherein the imaging device further includes
a plurality of individual imaging instruments disposed in positions different from one another in the same visual field range, and
a whole imaging instrument configured to perform imaging in a visual field range wider than a visual field range of the individual imaging instrument.

20. An image processing method performed by a computer and comprising:
setting a plurality of first evaluation target regions within the first image in which the target person is captured;
calculate a first evaluation value for each first evaluation target region, indicating a likelihood that the each first evaluation target region includes an iris of an eye of the target person;
selecting, as a candidate region and from among the plurality of first evaluation target regions, a first evaluation region for which the first evaluation value is greater than a first threshold value corresponding to the selected first evaluation region including the iris of the eye of the target person;
calculating a second evaluation value for the candidate region, indicating a likelihood that the iris of the eye of the target person is in a center part of the candidate region, based on a reflection pattern formed in the candidate region in response to application of light having a predetermined irradiation pattern to the target person;
identifying, as an eye region represents the eye of the target person, in response to the second evaluation value being greater than a second threshold value corresponding to the identified eye region being sufficient for biometric iris authentication of the target person and such that biometric iris authentication accuracy is improved;
extracting a feature value of the identified eye region; and
performing biometric iris authentication of the target person using the extracted feature value.

* * * * *